United States Patent
Horiuchi

(10) Patent No.: US 8,730,534 B2
(45) Date of Patent: May 20, 2014

(54) ILLUMINATING APPARATUS, IMAGE READING APPARATUS, AND IMAGE FORMING APPARATUS

(75) Inventor: Takao Horiuchi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 49 days.

(21) Appl. No.: 13/523,963

(22) Filed: Jun. 15, 2012

(65) Prior Publication Data

US 2012/0320435 A1 Dec. 20, 2012

(30) Foreign Application Priority Data

Jun. 16, 2011 (JP) .................................. 2011-133967

(51) Int. Cl.
*H04N 1/04* (2006.01)
(52) U.S. Cl.
USPC ............ 358/475; 358/474; 358/496; 358/497
(58) Field of Classification Search
USPC .......................... 358/475, 474, 496, 497, 498
See application file for complete search history.

(56) References Cited

U.S. PATENT DOCUMENTS

| 8,427,717 | B2* | 4/2013 | Shimatani ...................... 358/475 |
| 2003/0142371 | A1* | 7/2003 | Hanabusa et al. ............. 358/475 |
| 2010/0182539 | A1* | 7/2010 | Ohyama et al. .................. 349/65 |
| 2011/0102863 | A1* | 5/2011 | Nakashima ................... 358/475 |

FOREIGN PATENT DOCUMENTS

| GB | 2144943 A | 3/1985 |
| JP | 60-33558 A | 2/1985 |
| JP | 1-265661 A | 10/1989 |
| JP | 4-344992 A | 12/1992 |
| JP | 2003-215726 A | 7/2003 |
| JP | 2008-118246 A | 5/2008 |
| JP | 2008-180842 A | 8/2008 |
| JP | 2010-238635 A | 10/2010 |
| JP | 2011-101114 A | 5/2011 |

* cited by examiner

*Primary Examiner* — Houshang Safaipour
(74) *Attorney, Agent, or Firm* — Birch, Stewart, Kolasch & Birch, LLP

(57) ABSTRACT

In an illuminating apparatus including a plurality of rows of light source groups each having a plurality of light-emitting elements for irradiating light to an original that are arranged in a main scanning direction, the light-emitting elements in the plurality of rows of light source groups illuminate an irradiated face of the original at the same pitch within the same light source group and at different pitches from each other among the plurality of rows of light source groups.

11 Claims, 22 Drawing Sheets

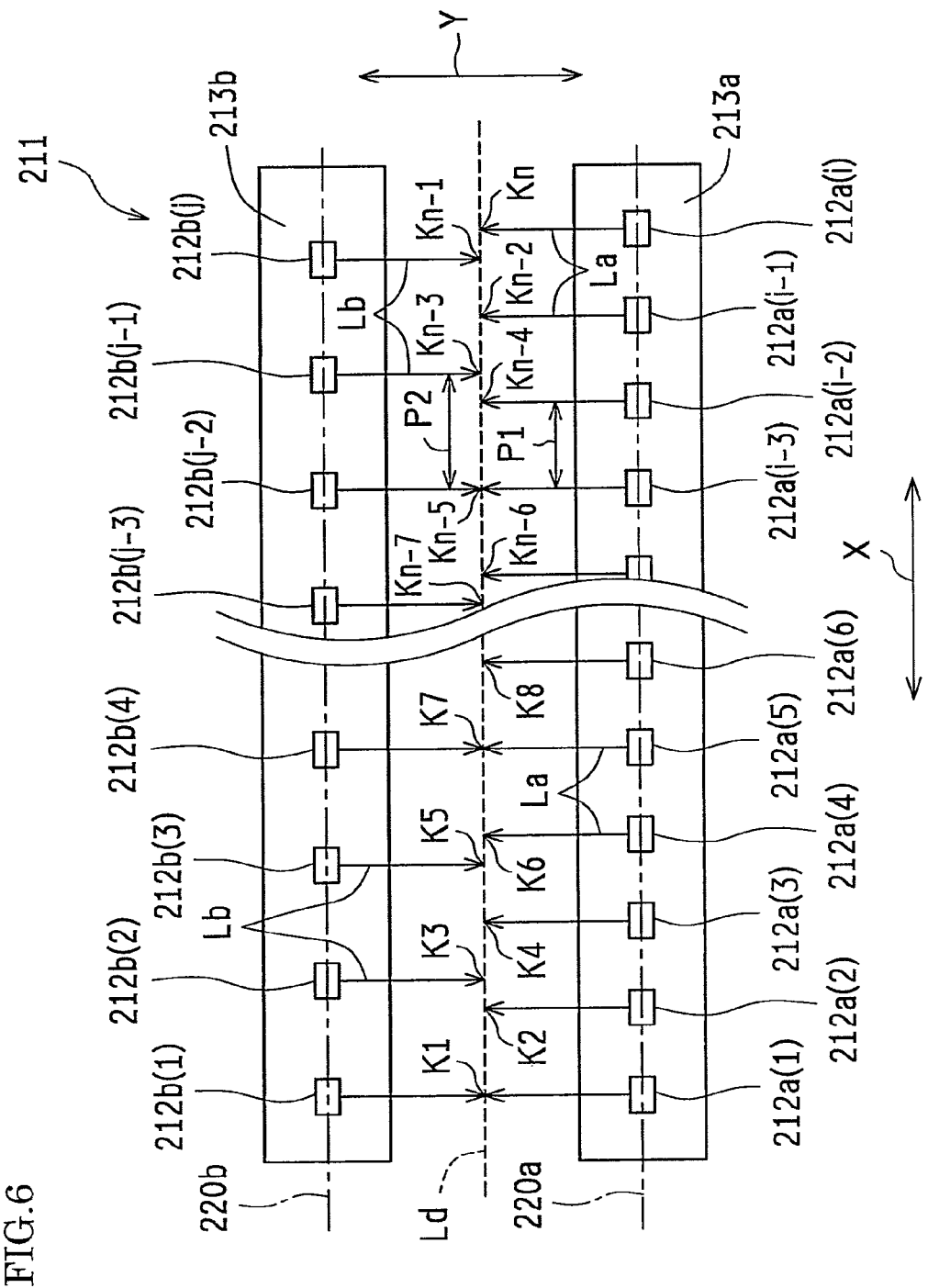

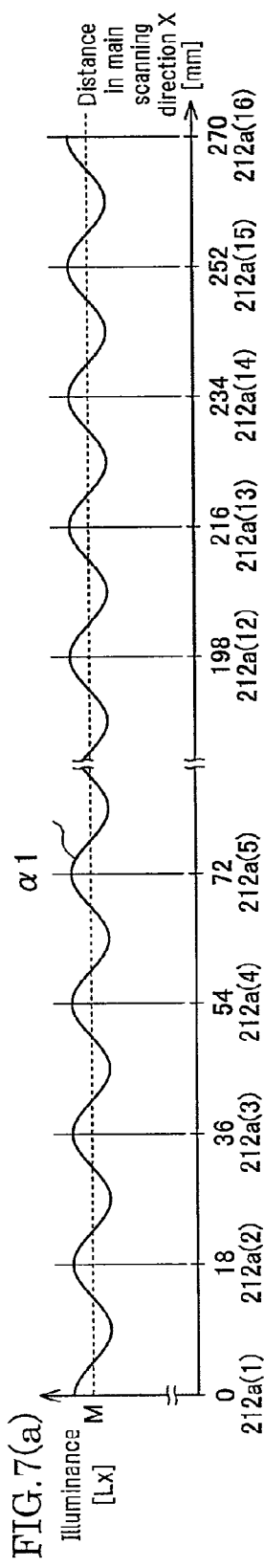
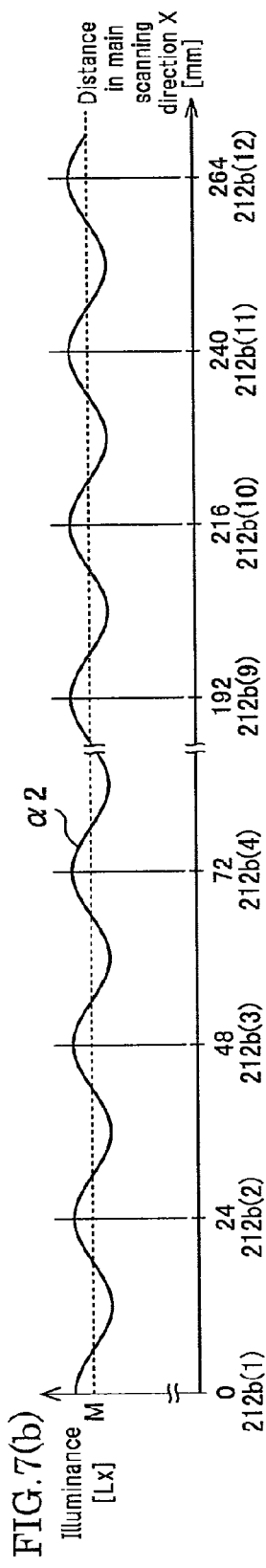
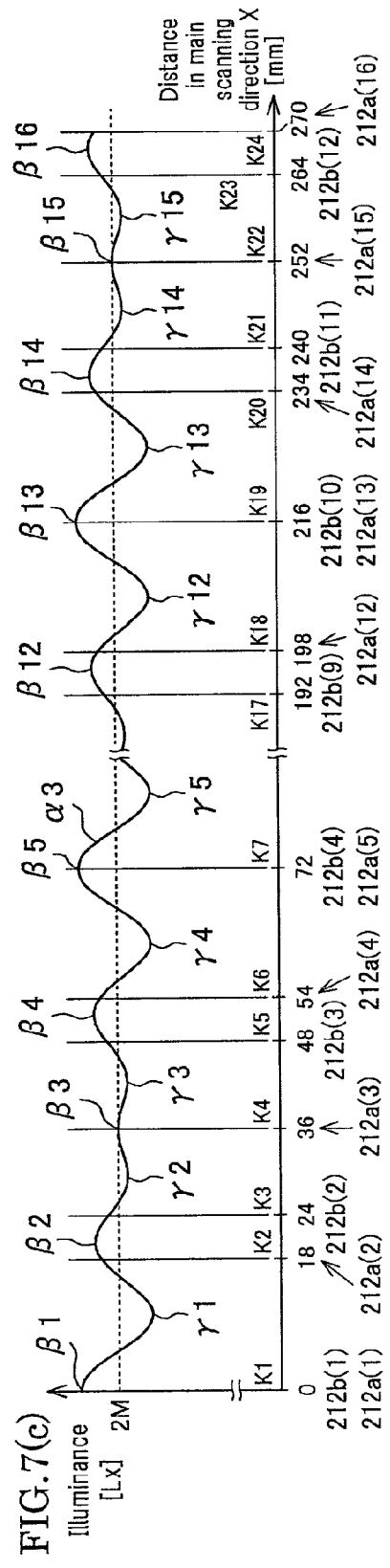

| Unlighted first light-emitting element | Second light-emitting element for which light amount is increased | Third increased light amount | Seventh increased light amount |
|---|---|---|---|
| 212a(1) | 212b(1) | Nc(1) | Ng(1) |
| 212a(5) | 212b(5) | Nc(2) | Ng(2) |
| 212a(9) | 212b(5) | Nc(3) | Ng(3) |
| 212a(9) | 212b(9) | Nc(4) | Ng(4) |
| 212a(13) | 212b(9) | Nc(5) | Ng(5) |
| 212a(2) | 212b(2) | Nc(6) | Ng(6) |
| 212a(6) | 212b(6) | Nc(7) | Ng(7) |
| 212a(10) | 212b(6) | Nc(8) | Ng(8) |
| 212a(10) | 212b(10) | Nc(9) | Ng(9) |
| 212a(14) | 212b(10) | Nc(10) | Ng(10) |
| 212a(3) | 212b(3) | Nc(11) | Ng(11) |
| 212a(7) | 212b(7) | Nc(12) | Ng(12) |
| 212a(11) | 212b(7) | Nc(13) | Ng(13) |
| 212a(11) | 212b(11) | Nc(14) | Ng(14) |
| 212a(15) | 212b(11) | Nc(15) | Ng(15) |
| 212a(4) | 212b(4) | Nc(16) | Ng(16) |
| 212a(8) | 212b(8) | Nc(17) | Ng(17) |
| 212a(8) | 212b(8) | Nc(18) | Ng(18) |
| 212a(12) | 212b(12) | Nc(19) | Ng(19) |
| 212a(16) | 212b(12) | Nc(20) | Ng(20) |

| Unlighted second light-emitting element | First light-emitting element for which light amount is increased | Fourth increased light amount | Eighth increased light amount |
|---|---|---|---|
| 212b(1) | 212a(1) | Nd(1) | Nh(1) |
| 212b(5) | 212a(5) | Nd(2) | Nh(2) |
| 212b(5) | 212a(9) | Nd(3) | Nh(3) |
| 212b(9) | 212a(9) | Nd(4) | Nh(4) |
| 212b(9) | 212a(13) | Nd(5) | Nh(5) |
| 212b(2) | 212a(2) | Nd(6) | Nh(6) |
| 212b(6) | 212a(6) | Nd(7) | Nh(7) |
| 212b(6) | 212a(10) | Nd(8) | Nh(8) |
| 212b(10) | 212a(10) | Nd(9) | Nh(9) |
| 212b(10) | 212a(14) | Nd(10) | Nh(10) |
| 212b(3) | 212a(3) | Nd(11) | Nh(11) |
| 212b(7) | 212a(7) | Nd(12) | Nh(12) |
| 212b(7) | 212a(11) | Nd(13) | Nh(13) |
| 212b(11) | 212a(11) | Nd(14) | Nh(14) |
| 212b(11) | 212a(15) | Nd(15) | Nh(15) |
| 212b(4) | 212a(4) | Nd(16) | Nh(16) |
| 212b(8) | 212a(8) | Nd(17) | Nh(17) |
| 212b(8) | 212a(12) | Nd(18) | Nh(18) |
| 212b(12) | 212a(12) | Nd(19) | Nh(19) |
| 212b(12) | 212a(16) | Nd(20) | Nh(20) |

FIG.21(a)  Example 1    Optical axis distance 10 mm - Pitch 10 mm
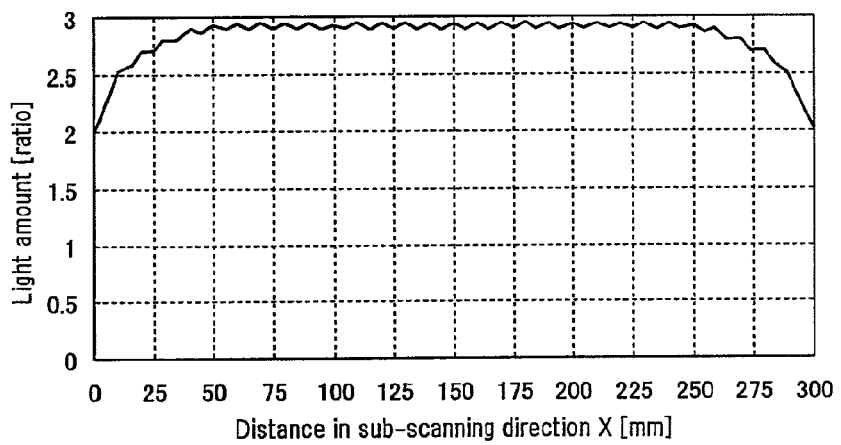
FIG.21(b)  Example 1    Optical axis distance 10 mm - Pitch 15 mm
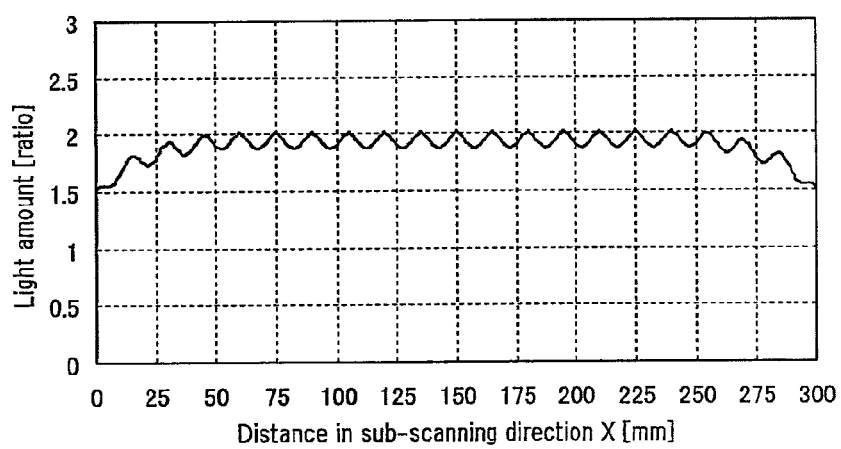
FIG.21(c)  Example 1    Combined illuminance
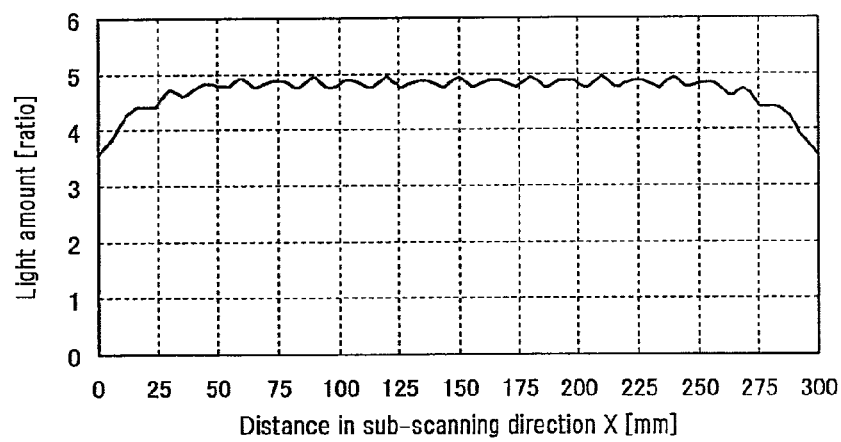

FIG.22(a) Example 2
Optical axis distance 10 mm – Pitch 10 mm
(Light amount of light-emitting element with common optical axis irradiation position reduced by 11.5%)
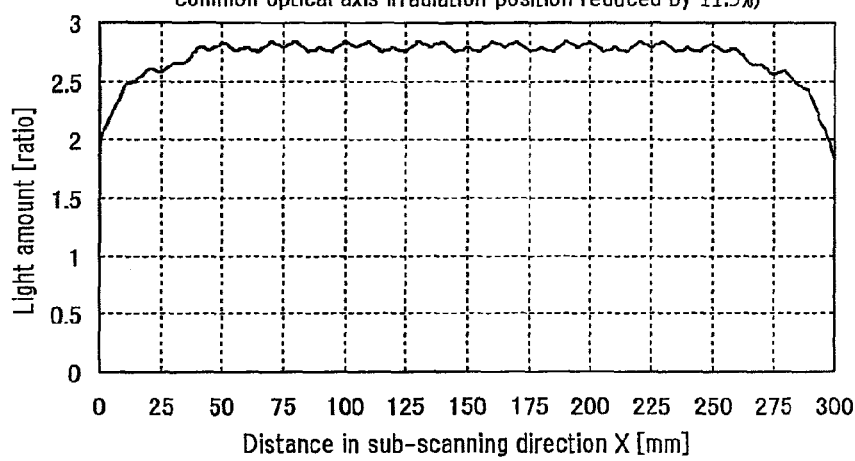
FIG.22(b) Example 2  Optical axis distance 10 mm – Pitch 15 mm
(Light amount unchanged)
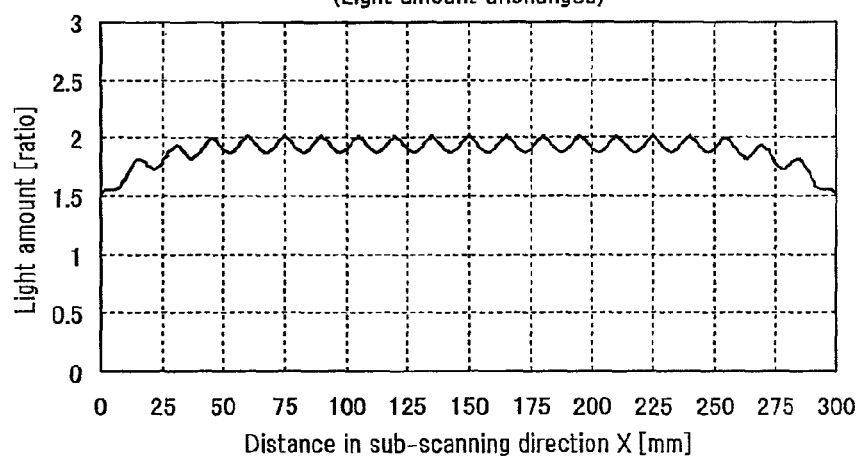
FIG.22(c) Example 2  Combined illuminance
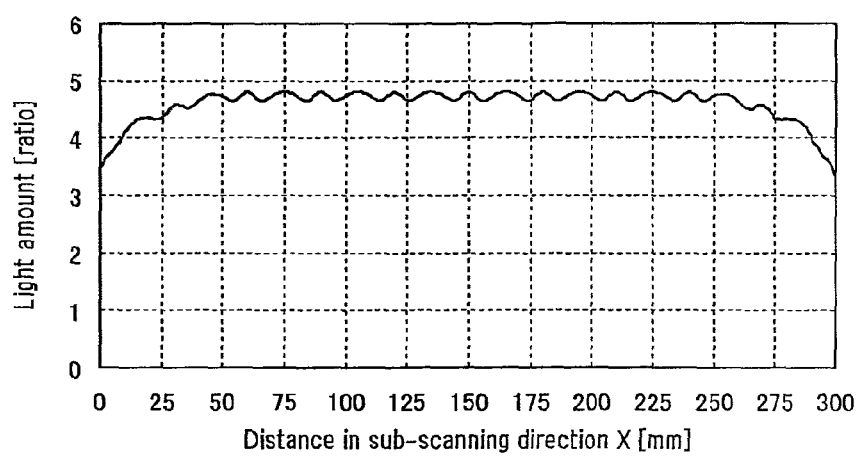

ILLUMINATING APPARATUS, IMAGE READING APPARATUS, AND IMAGE FORMING APPARATUS

CROSS-REFERENCE TO RELATED APPLICATION

This application claims priority under 35 U.S.C. §119(a) on Patent Application No. 2011-133967 filed in Japan on Jun. 16, 2011, the entire contents of which are herein incorporated by reference.

BACKGROUND OF THE INVENTION

1. Technical Field

The present invention relates to an illuminating apparatus that illuminates an original, an image reading apparatus, and an image forming apparatus.

2. Related Art

Generally, in image reading apparatuses provided in image forming apparatuses such as copiers, fax machines or digital multi-functional peripherals, or image reading apparatuses connected to a computer via communication means such as a network, light reflected from an original illuminated by an illuminating apparatus including a light source is read as original image.

For example, a conventional image reading apparatus includes an illuminating apparatus in which a light source for illuminating an original placed on an original stage glass and a first mirror are arranged, second and third mirrors, an imaging lens and an image sensor (for example, a line sensor such as a CCD (Charge Coupled Device)), and many of such image reading apparatuses are configured to read an original image by causing light reflected from the original illuminated by the light source to travel via the first mirror, the second mirror, the third mirror and then the imaging lens to form an image on the image sensor.

Also, an image reading apparatus is used as an image reading means when information on an image formed on an image sensor such as a CCD is converted to electronic signals and subjected to image processing, and transferred to an image forming portion that prints the image information or sent to a computer (for example, personal computer) connected to a network, for example.

Conventionally, a bar-shaped light source such as a halogen lamp or a xenon lamp, or a light source in which a plurality of light-emitting elements such as light-emitting diodes (LEDs) are arranged in a main scanning direction may be employed as a light source provided in illuminating apparatuses.

In the case where a light source in which a plurality of light-emitting elements are arranged is employed, light-emitting elements such as LEDs have strong directional characteristics in a predetermined direction, and thus uneven illuminance corresponding to the pitch between the light-emitting elements may occur on an irradiated face of the original.

For example, as the pitch between the light-emitting elements becomes larger, uneven illuminance on the irradiated face of the original caused by repeated areas of brightness and darkness in a main scanning direction becomes more noticeable. Therefore, it is preferable to make the pitch smaller, but if the pitch is made smaller, the number of necessary light-emitting elements increases, which results in an increase in cost.

From a viewpoint of mitigating uneven illuminance described above, JP2008-118246A discloses a light irradiating apparatus in which a plurality of light-emitting elements are arranged in a zigzag manner.

Incidentally, people usually tend to recognize an irradiated face of an original on which the degree of tone of brightness and darkness is uniform as uneven illuminance. In other words, the uneven illuminance caused by repeated areas of brightness and darkness in the main scanning direction is likely to be noticeable if the amplitude and the cycle of fluctuation of the illumination distribution on the irradiated face of an original in the main scanning direction are regular.

However, in the illuminating apparatus disclosed in JP2008-118246A mentioned above, since the light-emitting elements arranged in the main scanning direction on both sides in a sub-scanning direction are arranged in a zigzag manner, the amplitude and the cycle of fluctuation of the illumination distribution in the main scanning direction on the irradiated face of an original become regular, and accordingly the uneven illuminance is likely to be noticeable.

Therefore, it is an object of the present invention to provide an illuminating apparatus including a plurality of rows of light source groups each of which has a plurality of light-emitting elements that irradiates light to an original arranged in a main scanning direction, an illuminating apparatus being capable of making, less noticeable, uneven illuminance caused by repeated areas of brightness and darkness on an irradiated face of the original in the main scanning direction, an image reading apparatus and an image forming apparatus.

Note that the references for the technique related to the present invention include JP H4-344992A. Specifically, JP H4-344992A discloses an LED unit for an image sensor, in which a plurality of LEDs are arranged in series on a plurality of wires connected in parallel. When those LEDs are arranged, if one of the LEDs on a single wire fails and is disconnected, a current does not flow through any of the other LEDs on the same wire either, and the luminance on an irradiated face of an original partially decreases. To avoid this, between the LEDs on a single wire, the LEDs on another wire are separately arranged in a row.

SUMMARY OF THE INVENTION

The present invention provides an illuminating apparatus, an image reading apparatus and an image forming apparatus described below.

(1) Illuminating Apparatus

An illuminating apparatus including a plurality of rows of light source groups each having a plurality of light-emitting elements for irradiating light to an original that are arranged in a main scanning direction, wherein the light-emitting elements in the plurality of rows of light source groups illuminate an irradiated face of the original at a constant pitch within the same light source group and at different pitches from each other among the plurality of rows of light source groups.

(2) Image Reading Apparatus

An image reading apparatus provided with an illuminating apparatus including a plurality of rows of light source groups each having a plurality of light-emitting elements for irradiating light to an original that are arranged in a main scanning direction, and an original reading portion that reads light reflected from the original illuminated by the illuminating apparatus, the image reading apparatus including: a setting portion configured to set an amount of light of each light-emitting element in the plurality of rows of light source groups, wherein the light-emitting elements in the plurality of rows of light source groups illuminate an irradiated face of the original at a constant pitch within the same light source group and at different pitches from each other among the plurality of rows of light source groups, and if an illumination distribution that indicates uneven illuminance due to repeated areas of brightness and darkness on the irradiated face of the original in the main scanning direction falls out of a predetermined reference range of uneven illuminance, the light-emitting elements in the plurality of rows of light source groups are set by the setting portion to have an amount of light with which the illumination distribution falls within the reference range.

(3) Image Forming Apparatus

An image forming apparatus including: the image reading apparatus according to the above-described present invention; and an image forming portion configured to form an image of the original read by the image reading apparatus on a recording sheet.

Here, the "reference range of uneven illuminance" refers to the range of a degree of an illuminance difference between a bright area and a dark area in repeated areas of brightness and darkness in the main scanning direction on the irradiated face of the original. Examples of the degree of the illuminance difference may include a ratio of variation (slope) in the illuminance difference to a distance between a bright area and a dark area in the main scanning direction in the illumination distribution, and a ratio of variation (ripple ratio) in the illuminance difference to an average value of the illuminance in a bright area and a dark area in the illumination distribution.

According to the illuminating apparatus, the image reading apparatus, and the image forming apparatus of the present invention, the light-emitting elements in the plurality of rows of light source groups illuminate the irradiated face of the original at a constant pitch within the same light source group and at different pitches from each other among the plurality of rows of light source groups. Therefore, it is possible to prevent the amplitude and the cycle of fluctuation of the illumination distribution in the main scanning direction on the irradiated face of the original from becoming regular, and thus to make the uneven illuminance less noticeable.

Further, according to the image reading apparatus and the image forming apparatus of the present invention, if the illumination distribution falls out of the reference range, amounts of light of the light-emitting elements in the plurality of rows of light source groups are set by the setting portion to the amount of light with which the illumination distribution falls within the reference range, and it is thus possible to suppress the uneven illuminance and make the uneven illuminance less noticeable.

In the present invention, a mode where at least one of optical axis irradiation positions, each of which is an irradiation position of an optical axis to the irradiated face in the main scanning direction, of the plurality of light-emitting elements in at least two light source groups among the plurality of rows of light source groups is a point in common for the at least two light source groups can be taken as an example.

With this feature, the maximum illuminance can be obtained in the optical axis irradiation position at a point in common for the plurality of rows of light source groups. Thus, the illuminance in the illumination distribution in the bright area other than the bright area in the common optical axis irradiation position can be suppressed at a low level, and it is thus possible to reduce the number of light-emitting elements for which the amount of light needs to be set. In this case, from the viewpoint of reducing the light-emitting elements having the optical axis irradiation position at the point in common for the plurality of rows of light source groups and increasing the number of the optical axis irradiation positions, it is preferable that the plurality of light-emitting elements in a single light source group among the plurality of rows of light source groups have a pitch length different from an integral multiplication of a pitch between the light-emitting elements in other light source groups.

In the present invention, a mode where no optical axis irradiation positions, each of which is an irradiation position of an optical axis to the irradiated face in the main scanning direction, of the plurality of light-emitting elements are points in common for the plurality of rows of light source groups can be taken as an example.

With this feature, the number of the optical axis irradiation positions can be as many as the total number (maximum number) of the light-emitting elements in the plurality of rows of light source groups, and it is possible to make the uneven illuminance less noticeable as much.

In the present invention, a mode where at least one light source group among the plurality of rows of light source groups includes a plurality of wires each connecting the plurality of light-emitting elements in series in units of a plurality of light-emitting elements can be taken as an example.

With this feature, the plurality of light-emitting elements are connected in series in units of a plurality of light-emitting elements on each of the plurality of wires provided in at least one of the plurality of rows of light source groups, and it is thus possible to set amounts of light of the plurality of light-emitting elements to the amount of light with which the illumination distribution falls within the reference range in units of the plurality of light-emitting elements. With this configuration, the operation of adjusting the amount of light in advance can be simplified.

In the present invention, a mode where between the plurality of light-emitting elements on a single wire among the plurality of wires, the plurality of light-emitting elements on another wire are separately arranged in a row in the same arrangement order in the main scanning direction can be taken as an example.

With this feature, between the plurality of light-emitting elements on a single wire among the plurality of wires, the plurality of light-emitting elements on another wire are separately arranged in a row in the same arrangement order in the main scanning direction. Therefore, even if the light-emitting elements connected in series in units of a plurality of light-emitting elements become unlighted, the light-emitting elements interspersed in the main scanning direction become unlighted, and so the unlighted light-emitting elements can be dispersed in the main scanning direction. It is thus possible to disperse the width of an area where the illuminance lowers on the irradiated face of the original in the main scanning direction, and make the uneven illuminance less noticeable as much.

In the present invention, a mode where each of the plurality of wires in the one light source group connects in series the light-emitting elements arranged in the main scanning direction in the one light source group in units of the number of light-emitting elements obtained by dividing a length of a minimum common multiple of the pitches in the plurality of rows of light source groups by a length of the pitch between the light-emitting elements in the one light source group can be taken as an example.

With this feature, the amounts of light of the light-emitting elements in the plurality of rows of light source groups set by the setting portion can be set in accordance with the cycle of the illumination distribution, and it is thus possible to easily adjust the amounts of light with accuracy.

In the present invention, a mode where if the plurality of light-emitting elements connected in series in units of a plurality of light-emitting elements become unlighted, a first light amount control for increasing, to an amount of light with which the illumination distribution falls within the reference range, an amount of light of a light-emitting element located adjacent to each unlighted light-emitting element in the light source group of the unlighted light-emitting elements is performed can be taken as an example.

With this feature, decline in the illuminance of the unlighted light-emitting elements on the irradiated face of the original can be compensated by performing the first light amount control, and it is thus possible to secure the amount of light on the irradiated face and maintain the illumination distribution within the reference range.

In the present invention, a mode where if the plurality of light-emitting elements connected in series in units of a plurality of light-emitting elements become unlighted, a second light among control for increasing, to an amount of light with which the illumination distribution falls within the reference range, an amount of light of a predetermined light-emitting element in the light source group other than the light source group of the unlighted light-emitting elements that involves the illumination distribution of the unlighted light-emitting elements on the irradiated face is performed can be taken as an example.

With this feature, decline in the illuminance of the unlighted light-emitting elements on the irradiated face of the original can be compensated by performing the second light amount control, and it is thus possible to secure the illuminance on the irradiated face and maintain the illumination distribution within the reference range.

As described above, according to the illuminating apparatus, the image reading apparatus and the image forming apparatus of the present invention, the light-emitting elements in the plurality of rows of the light source groups illuminate an irradiated face of the original at a constant pitch within the same light source and at different pitches from each other among the plurality of rows of light source groups, and therefore the amplitude and the cycle of fluctuation of the illumination distribution in the main scanning direction on the irradiated face of the original can be prevented from becoming regular. It is thus possible to make the uneven illuminance less noticeable.

Further, according to the image reading apparatus and the image forming apparatus of the present invention, if the illumination distribution falls out of the reference range, amounts of light of the light-emitting elements in the plurality of rows of light source groups are set by the setting portion to the amount of light with which the illumination distribution falls within the reference range, and it is thus possible to suppress the uneven illuminance and make the uneven illuminance less noticeable.

BRIEF DESCRIPTION OF THE DRAWINGS

FIG. 3 are diagrams showing a schematic configuration of a light source unit, where

FIG. 4 are diagrams showing a schematic configuration of a light source in the light source unit, where

FIG. 6 is a schematic plan view showing an example of a state of arrangement of a first light source group and a second light source group mounted on a first light source substrate and a second light source substrate, respectively.

FIG. 7 are graphs showing an example of an illumination distribution in a light irradiation region in the main scanning direction when all light-emitting elements have the same amount of light, where FIG. 7(a) is a diagram showing an illumination distribution in the case where only optical axes of the first light-emitting elements in the first light source group are irradiated to the light irradiation region, FIG. 7(b) is a diagram showing an illumination distribution in the case where only optical axes of the second light-emitting elements in the second light source group are irradiated to the light irradiation region, and FIG. 7(c) is a diagram showing an illumination distribution in the case where optical axes of the first and second light-emitting elements in the first and second light source groups are irradiated to the light irradiation region.

FIG. 13 are data structure diagrams of the first and second position tables, where

FIG. 14 are data structure diagrams of first and second light amount tables, where FIG. 14(a) is an example of the first light amount table storing correspondence between the first light-emitting elements and the second light-emitting elements that contribute to an influence of the illuminance of the first light-emitting elements on an illumination distribution and the third increased light amounts by which amounts of light of the second light-emitting elements are increased, and FIG. 14(b) is an example of the second light amount table storing correspondence between the second light-emitting elements and the first light-emitting elements that contribute to an influence of the illuminance of the second light-emitting elements on an illumination distribution and the fourth increased light amounts by which amounts of light of the first light-emitting elements are increased.

FIG. 16(a) is a diagram showing an illumination distribution in the case where only optical axes of the first light-emitting elements in the first light source group are irradiated to the light irradiation region, FIG. 16(b) is a diagram showing an illumination distribution in the case where only optical axes of the second light-emitting elements in the second light source group are irradiated to the light irradiation region, and FIG. 16(c) is a diagram showing an illumination distribution in the case where optical axes of the first and second light-emitting elements in the first and second light source groups are irradiated to the light irradiation region.

FIG. 21 are graphs showing a light amount distribution in Example 1 where all first light-emitting elements in the first light source group have the same amount of light and all second light-emitting elements in the second light source group also have the same amount of light that is different from that of the first light-emitting elements, where FIG. 21(a) is a diagram showing a light amount distribution solely of the first light source group, FIG. 21(b) is a diagram showing a light amount distribution solely of the second light source group, and FIG. 21(c) is a diagram showing a light amount distribution obtained by combining the light amount distributions of the first and second light source groups.

FIG. 22 are graphs showing a light amount distribution in Example 2 where amounts of light of the light-emitting elements having the optical axis irradiation positions at the points in common for the first light source group and the second light source group are reduced in the configuration of Example 1, where FIG. 22(a) is a diagram showing a light amount distribution solely of the first light source group, FIG. 22(b) is a diagram showing a light amount distribution solely of the second light source group, and FIG. 22(c) is a diagram showing a light amount distribution obtained by combining the light amount distributions of the first and second light source groups.

DESCRIPTION OF REFERENCE NUMERALS

Embodiments of the present invention will be hereinafter described with reference to the drawings. Note that the following embodiments are examples of embodying the invention, and do not limit the technical scope of the invention.

Figure 1:
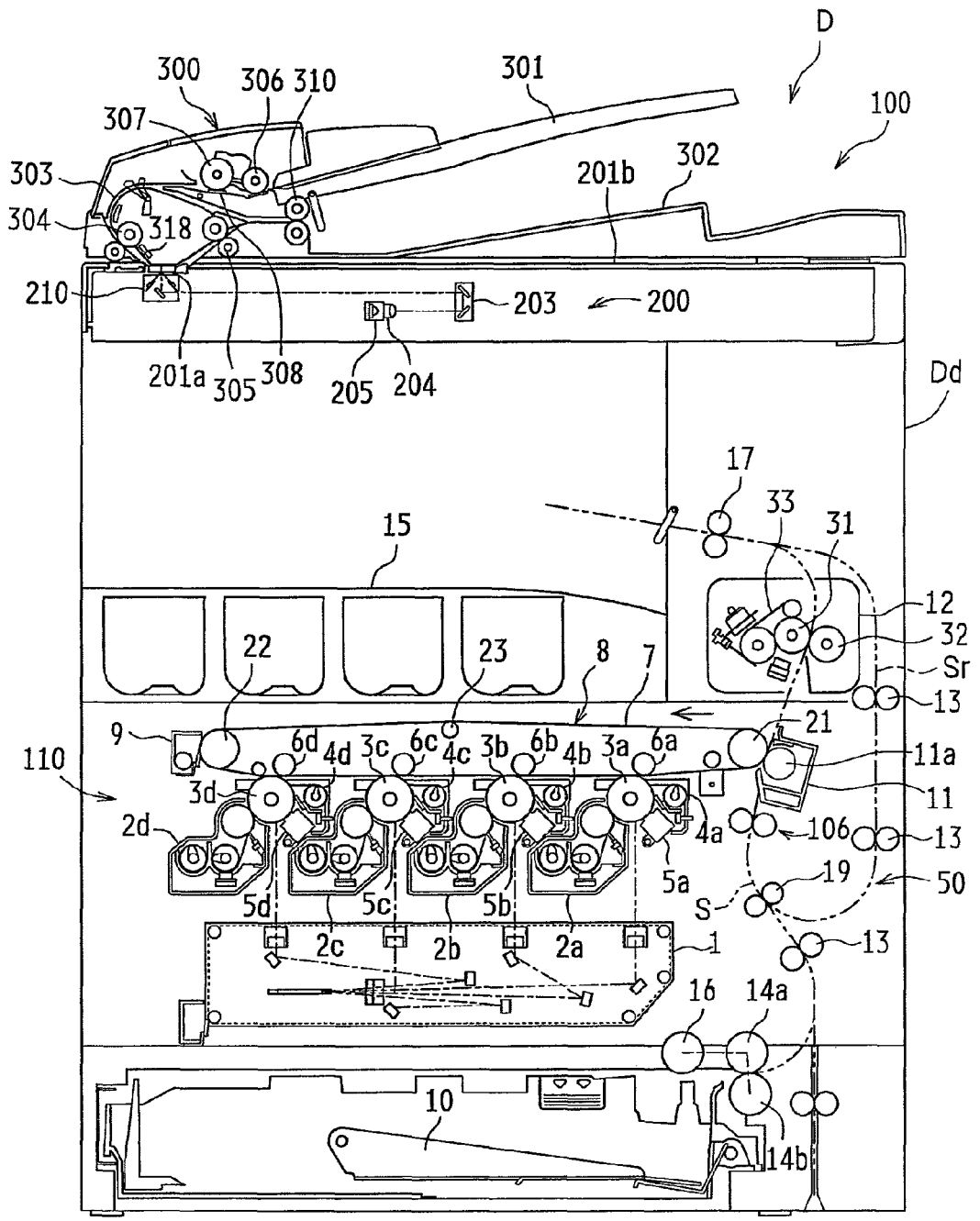
FIG. 1 is a schematic cross-sectional view of an image forming apparatus provided with an image reading apparatus according to an embodiment of the present invention.

FIG. 1 is a schematic cross-sectional view of an image forming apparatus D provided with an image reading apparatus 100 according to an embodiment of the present invention.

The image forming apparatus D shown in FIG. 1 is provided with the image reading apparatus 100, which reads an image of an original G (see FIG. 2, etc. described later) and an apparatus main body Dd, which records and forms the image on the original G read by the image reading apparatus 100 or image externally received in color or in monochrome on a recording sheet such as plain paper.

Overall Configuration of Image Forming Apparatus

The apparatus main body Dd of the image forming apparatus D includes an exposing apparatus 1, development apparatuses 2 (2a, 2b, 2c and 2d), photosensitive drums 3 (3a, 3b, 3c and 3d) that function as image carriers, charging units 5 (5a, 5b, 5c and 5d), cleaner apparatuses 4 (4a, 4b, 4c and 4d), an intermediate transfer belt apparatus 8 including intermediate transfer rollers 6 (6a, 6b, 6c and 6d) that functions as a transfer portion, a fixing apparatus 12, a sheet transport apparatus 50, a paper feed tray 10 that functions as a paper feed portion, and a discharge tray 15 that functions as a paper discharge portion.

The image data handled in the apparatus main body Dd of the image forming apparatus D corresponds to a color image using colors of black (K), cyan (C), magenta (M), and yellow (Y), or corresponds to a monochrome image using a single color (e.g., black). Accordingly, four each of the development apparatuses 2 (2a, 2b, 2c and 2d), the photosensitive drums 3 (3a, 3b, 3c and 3d), the charging units 5 (5a, 5b, 5c and 5d), the cleaner apparatuses 4 (4a, 4b, 4c and 4d), and the intermediate transfer rollers 6 (6a, 6b, 6c and 6d) are provided so as to form four images corresponding to the respective colors, thus forming four image stations. The suffix letters "a" to "d" respectively correspond to black, cyan, magenta, and yellow. In the description below, the suffix letters "a" to "d" are omitted.

The photosensitive drums 3 are arranged substantially in the center in the vertical direction of the apparatus main body Dd. The charging units 5 are charging means for evenly charging the surface of the photosensitive drums 3 to a predetermined potential, and may be of the roller type or of the brush type, which are contact types, but may also be of the charger type.

Here, the exposing apparatus 1 is a laser scanning unit (LSU) including a laser diode and a reflecting mirror, and exposes the surface of the charged photosensitive drums 3 to light according to image data, thereby forming on the surface an electrostatic latent image in accordance with to the image data.

The development apparatuses 2 develop an electrostatic latent image formed on the photosensitive drums 3 in four colors (K, C, M and Y) of toners. The cleaner apparatuses 4 remove and collect toner remaining on the surface of the photosensitive drums 3 after an image is developed and transferred.

The intermediate transfer belt apparatus 8 arranged above the photosensitive drums 3 includes, in addition to the intermediate transfer rollers 6, an intermediate transfer belt 7, an intermediate transfer belt drive roller 21, an idler roller 22, a tension roller 23 and an intermediate transfer belt cleaning apparatus 9.

Roller members such as the intermediate transfer belt drive roller 21, the intermediate transfer rollers 6, the idler roller 22, the tension roller 23 and the like support the intermediate transfer belt 7 in a stretched and tensioned manner, and rotate the intermediate transfer belt 7 in a prescribed sheet transport direction (direction of the arrow in the drawing).

The intermediate transfer rollers 6 are rotatably supported inside the intermediate transfer belt 7, and pressed against the photosensitive drums 3 via the intermediate transfer belt 7.

The intermediate transfer belt 7 is provided in contact with the respective photosensitive drums 3, and the toner images on the surfaces of the respective photosensitive drums 3 are sequentially transferred and superposed on the intermediate transfer belt 7, forming a color toner image (a toner image in the respective colors). Here, the intermediate transfer belt 7 is formed as an endless belt using a film having a thickness of 100 μm to 150 μm, approximately.

The toner images are transferred from the photosensitive drums 3 to the intermediate transfer belt 7 using the intermediate transfer rollers 6 pressed against the inner side (back face) of the intermediate transfer belt 7. A high-voltage transfer bias (for example, a high voltage of the opposite polarity (+) to the charge polarity (−) of the toner) is applied to the intermediate transfer rollers 6 to transfer the toner images. Here, the intermediate transfer rollers 6 are rollers including a base that is made of a metal (e.g., stainless steel) shaft having a diameter of 8 to 10 mm, the surface of the shaft being covered with an electrically conductive elastic material (e.g., EPDM, urethane foam, etc.). The electrically conductive elastic material enables a high voltage to be evenly applied to the intermediate transfer belt 7.

The apparatus main body Dd of the image forming apparatus D further includes a secondary transfer apparatus 11 that includes a transfer roller 11a functioning as a transfer portion. The transfer roller 11a contacts the side (outer side) opposite to the intermediate transfer belt drive roller 21 of the intermediate transfer belt 7.

As described above, toner images on the surfaces of the respective photosensitive drums 3 are superposed on the intermediate transfer belt 7, forming a color toner image represented by the image data. The thus superposed toner images in the respective colors are transported with the intermediate transfer belt 7 and transferred on a recording sheet by the secondary transfer apparatus 11.

The intermediate transfer belt 7 and the transfer roller 11a of the secondary transfer apparatus 11 are pressed against each other to form a nip region. A voltage (for example, a high voltage of the opposite polarity (+) to the charge polarity (−) of the toner) for transferring the toner images in the respective colors on the intermediate transfer belt 7 to a recording sheet is applied to the transfer roller 11a of the secondary transfer apparatus 11. Furthermore, in order to constantly maintain the nip region, one of the transfer roller 11a of the secondary transfer apparatus 11 and the intermediate transfer belt drive roller 21 is made of a hard material (metal, etc.), and the other is made of a soft material such as an elastic roller (elastic rubber roller, foamable resin roller, etc.).

The toner image on the intermediate transfer belt 7 may not be completely transferred by the secondary transfer apparatus 11 to a recording sheet, and toner may remain on the intermediate transfer belt 7. This residual toner causes toner color mixing in the following step. Accordingly, the residual toner is removed and collected by the intermediate transfer belt cleaning apparatus 9. The intermediate transfer belt cleaning apparatus 9 includes, for example, a cleaning blade serving as a cleaning member that is in contact with the intermediate transfer belt 7, and the residual toner can be removed and collected by the cleaning blade. The idler roller 22 supports the intermediate transfer belt 7 from the inner side (back face), and the cleaning blade is in contact with the intermediate transfer belt 7 to press from outside against the idler roller 22.

The paper feed tray 10 is a tray in which recording sheets are stored, and is provided below the image forming portion 110 of the apparatus main body Dd. The discharge tray 15 provided above the image forming portion 110 is a tray on which printed recording sheets are placed facedown.

In addition, the apparatus main body Dd is provided with the sheet transport apparatus 50 for feeding a recording sheet in the paper feed tray 10 to the discharge tray 15 via the secondary transfer apparatus 11 and the fixing apparatus 12. The sheet transport apparatus 50 includes an S-shaped sheet transport path S, and transport members such as a pickup roller 16, a separation roller 14a, an isolating roller 14b, transport rollers 13, a pre-registration roller pair 19, a registration roller pair 106, the fixing apparatus 12 and a discharge roller 17 are arranged along the sheet transport path S.

The pickup roller 16 is a draw-in roller that is disposed in a downstream side end portion in the sheet transport direction of the paper feed tray 10 and feeds recording sheets one by one from the paper feed tray 10 into the sheet transport path S. The separation roller 14a allows recording sheets to pass through between the separation roller 14a and the isolating roller 14b to separate the sheets into individual sheets and transports the separated sheets to the sheet transport path S. The transport rollers 13 and the pre-registration roller pair 19 are small rollers for facilitating and assisting transportation of the recording sheets. The transport rollers 13 are disposed at a plurality of locations in the sheet transport path S. The pre-registration roller pair 19 is disposed immediately before the registration roller pair 106 on the upstream side in the sheet transport direction, and transports a recording sheet to the registration roller pair 106.

The registration roller pair 106 temporarily stops the transported recording sheet at the pre-registration roller pair 19, aligns the leading end of the recording sheet, and timely transports the recording sheet in conjunction with rotation of the photosensitive drums 3 and the intermediate transfer belt 7 such that a color toner image on the intermediate transfer belt 7 is transferred to the recording sheet at the nip region between the intermediate transfer belt 7 and the secondary transfer apparatus 11.

For example, the registration roller pair 106 transports the recording sheet such that the leading end of the color toner image on the intermediate transfer belt 7 is aligned with the leading end of an image forming area on the recording sheet at the nip region between the intermediate transfer belt 7 and the secondary transfer apparatus 11.

The fixing apparatus 12 includes a heat roller 31 and a pressure roller 32. The heat roller 31 and the pressure roller 32 hold the recording sheet therebetween and transport it.

The temperature of the heat roller 31 is controlled at a prescribed fixing temperature, and the heat roller 31 performs thermal pressing on the recording sheet with the pressure roller 32 to melt, mix and press the toner images transferred on the recording sheet, thereby thermally fixing the toner images on the recording sheet. An exterior heating belt 33 for heating the heat roller 31 from outside is also provided in the fixing apparatus 12.

After the toner images in the respective colors are fixed, the recording sheet is discharged to the discharge tray 15 by the discharge rollers 17.

Note that it is also possible to form a monochrome image by using at least one of the four image forming stations, and transfer the monochrome image to the intermediate transfer belt 7 of the intermediate transfer belt apparatus 8. The monochrome image is also transferred to the recording sheet from the intermediate transfer belt 7, similarly to the color image, and fixed on the recording sheet.

Also, in the case where an image is formed not only on the front face of the recording sheet but on both faces, after the image on the front face of the recording sheet is fixed by the fixing apparatus 12, the discharge roller 17 is stopped while the recording sheet is transported by the discharge rollers 17 in the sheet transport path S, and then the discharge roller 17 is rotated in reverse to allow the recording sheet to pass through a front-back reverse path Sr. The front and back faces of the recording sheet are then inverted, and the recording sheet is again guided to the registration roller pair 106. Then, an image is recorded and fixed on the back face of the recording sheet similarly to the front face of the recording sheet, and the recording sheet is discharged to the discharge tray 15.

Overall Configuration of Image Reading Apparatus

Figure 2:
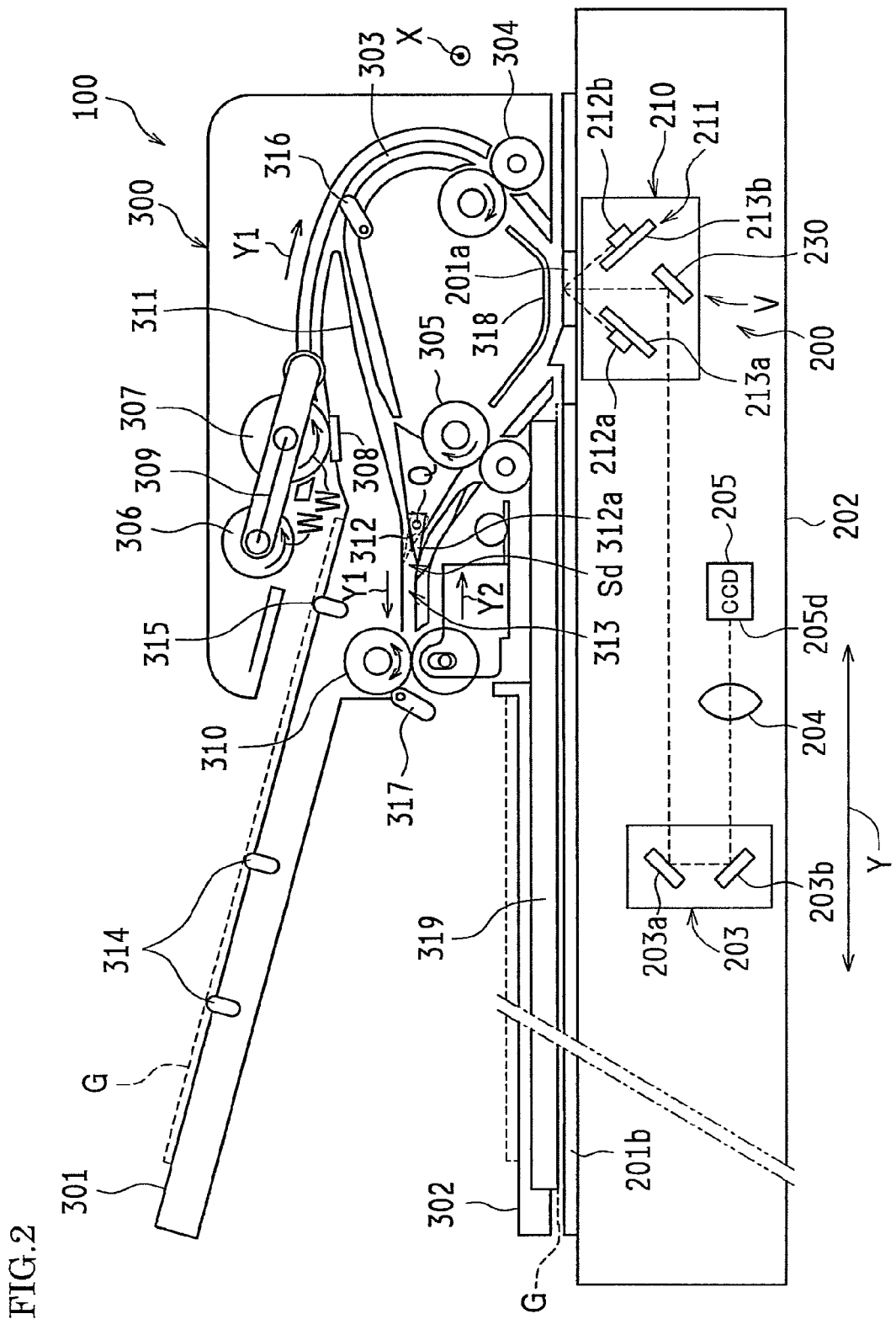
FIG. 2 is a schematic cross-sectional view of the image reading apparatus shown in FIG. 1 viewed from the back.

FIG. 2 is a schematic cross-sectional view of the image reading apparatus 100 shown in FIG. 1 viewed from the back. The image reading apparatus 100 shown in FIGS. 1 and 2, which is an image reading apparatus of a reduction optical system type, is configured to read an original image while moving the original G in a moving original reading arrangement, and to read an original image while keeping the original G fixed in a stationary original reading arrangement.

In other words, the image reading apparatus 100 is provided with a moving original reading configuration (moving original reading function) for implementing a moving original reading mode and a stationary original reading configuration (stationary original reading function) for implementing a stationary original reading mode.

With the moving original reading configuration, the original G moved toward one side of the sub-scanning direction (the direction indicated by arrow Y1 in the figure) to pass through over the original reading glasses 201a, which are an example of a first transparent plate, in an automatic original feeder 300 that automatically transports the original G is illuminated, via the original reading glasses 201a, by a light source unit 210 (an example of the illuminating apparatus) located in a reading position V in the original reading portion 200, while light reflected from the original G illuminated by the light source unit 210 is scanned in the main scanning direction (the direction of arrow X in FIG. 2), and the original image is read.

With the stationary original reading configuration, the light source unit 210 is moved toward one side of the sub-scanning direction Y, while the original G placed on a platen glass (original stage glass) 201b, which is an example of the second transparent plate, is illuminated via the platen glass 201b, and light reflected from the original G illuminated by the light source unit 210 is scanned in the main scanning direction X, and the original image is read. Note that FIG. 2 shows a state of the light source unit 210 in the reading position V.

Specifically, the original reading portion 200 includes the platen glass 201b, the light source unit 210 that works as a scanning body, an optical system drive unit 530 (not shown in FIGS. 1 and 2, see FIG. 8 described later) that moves the light source unit 210, a mirror unit 203, a condensing lens 204 and a photoelectric conversion element (here, CCD) 205, and those members are housed in a metal frame body 202. The light source unit 210 includes a light source 211 that irradiates light toward the original G and a first mirror 230 that guides light reflected from the original G to the mirror unit 203. The light source unit 210 that includes constituents such as first and second light-emitting elements 212a . . . and 212b . . . and first and second light source substrates 213a and 213b will be described later with reference to FIG. 3.

The platen glass 201b on which the original G is placed is made of a transparent glass plate, and both end portions thereof in the main scanning direction X are place on the frame body 202. Note that the automatic original feeder 300 is capable of opening and closing with respect to the original reading portion 200 about an axis line along the sub-scanning direction Y (pivotally supported by a hinge, for example), and its bottom face is provided with as an original pressing member 319 for pressing the original G placed on the platen glass 201b of the original reading portion 200 from above.

The mirror unit 203 includes a second mirror 203a, a third mirror 203b and a supporting member (not shown). The supporting member supports the second mirror 203a so as to reflect light from the first mirror 230 in the light source unit 210 to be guided to the third mirror 203b. The supporting member also supports the third mirror 203b so as to reflect light from the second mirror 203a to be guided to the condensing lens 204. The condensing lens 204 condenses light from the third mirror 203b to a light-receiving face 205d of the photoelectric conversion element 205. The photoelectric conversion element 205 repeatedly scans light (original image light) from the condensing lens 204 in the main scanning direction X, and outputs an analog signal for a single scanning line at every scan.

Further, the optical system drive unit 530 here includes a scanner motor, which is not shown in the figure, and a moving mechanism such as a pulley and a wire, which is not shown in the figure, and is configured to move, using the scanner motor and the moving mechanism, the light source unit 210 at a constant speed in the sub-scanning direction Y, and move the mirror unit 203 also in the sub-scanning direction Y at a moving speed that is half the moving speed of the light source unit 210.

Here, the original reading portion 200 supports not only the stationary original reading arrangement but also the moving original reading arrangement, and includes the original reading glasses 201a. Accordingly, the optical system drive unit 530 is further configured to position the light source unit 210 in the prescribed home position V below the original reading glasses 201a.

The automatic original feeder 300 includes an original tray 301 on which the original G is placed for transportation, a discharge tray 302 arranged below the original tray 301, a first transport path 303 that connects the original tray 301 and the discharge tray 302, and two transport roller pairs including an upstream side transport roller pair 304 and a downstream side transport roller pair 305.

The upstream side transport roller pair 304 transports the original G on the upstream side in the transport direction Y1 of the original G with respect to the original reading glasses 201a. The downstream side transport roller pair 305 transports the original G on the downstream side in the transport direction Y1 of the original G with respect to the original reading glasses 201a. Specifically, the upstream side transport roller pair 304, the original reading glasses 201a and the downstream side transport roller pair 305 are arranged in this order in the transport direction Y1. Also, the original reading glasses 201a are disposed substantially horizontally so as to form a part of a transport wall of the first transport path 303.

The automatic original feeder 300 further includes a pickup roller 306, a separation roller 307 and a separation member 308 such as a separation pad.

The pickup roller 306 feeds forward the original G placed on the original tray 301 from the original tray 301 to the first transport path 303 in the transport direction Y1. The separation roller 307 is arranged on the downstream side in the transport direction Y1 relative to the pickup roller 306, and holds the original G sent by the pickup roller 306 between the separation roller 307 and the separation member 308, and further transports the original G to the downstream side in the transport direction Y1. The separation member 308 is opposed to the separation roller 307 and separates (isolates) the originals G transported therebetween into individual sheets.

The automatic original feeder 300 configured as described above transports the originals G between the separation roller 307 and the separation member 308 using the pickup roller 306, where the originals G are separated and isolated, and then transported sheet by sheet as a result of the separation roller 307 being driven to rotate. Then, the original G transported by the separation roller 307 is guided by the first transport path 303, thereby feeding the original G sheet by sheet toward the upstream side transport roller pair 304.

Specifically, the pickup roller 306 is capable of coming into and out of contact with the original G placed on the original tray 301 with the use of a pickup roller drive portion that is not shown in the figure. In addition, the pickup roller 306 is connected to the separation roller 307 via a drive transmission means 309 including an endless belt or the like so as to rotate in the same direction as the separation roller 307. When requested to read the original G, the pickup roller 306 and the separation roller 307 are driven by an original feed drive portion not shown in the figure to rotate in a direction for transporting the original G in the transport direction Y1 (arrow W in FIG. 2).

In the present embodiment, the automatic original feeder 300 is also configured such that, after transporting the original G so as to allow one face thereof to be read, the original G is inverted to reverse the front and back faces thereof, thereby transporting the original G so as to allow the other face thereof to be read.

Specifically, in addition to the above-described configuration, the automatic original feeder 300 further includes a reverse roller pair 310, a second transport path 311 and a switching claw 312.

The first transport path 303 is formed as a loop to transport the original G from the separation roller 307 to the discharge tray 302 via the upstream side transport roller pair 304, the original reading glasses 201a, the downstream side transport roller pair 305 and the reverse roller pair 310. The reverse roller pair 310 is disposed on the downstream side in the transport direction Y1 relative to the downstream side transport roller pair 305, and transports the original G from the downstream side transport roller pair 305 such that the trailing end of the original G (the upstream side end in the transport direction Y1) is in the front. The second transport path 311 is branched at a branch portion Sd between the reverse roller pair 310 and the downstream side transport roller pair 305, and guides the original G transported by the reverse roller pair 310 such that the trailing end of the original G is in the front to the further upstream side in the transport direction Y1 than the upstream side transport roller pair 304 in the first transport path 303, in order to invert the original G to reverse the front and back faces thereof. A switchback transport path 313 is formed between the reverse roller pair 310 and the branch portion Sd in the first transport path 303. The switchback transport path 313 is capable of transportation of the original G due to rotation of the reverse roller pair 310 in the forward direction (the transport direction Y1 of the original G) and reverse transportation of the original G due to rotation of the reverse roller pair 310 in the reverse direction.

The switching claw 312 is arranged in the branch portion Sd, and is configured to be capable of taking a first switching posture in which the original G is guided from the reverse roller pair 310 to the upstream side transport roller pair 304 via the second transport path 311, and a second switching posture in which the original G is guided from the downstream side transport roller pair 305 to the reverse roller pair 310 via the switchback transport path 313.

Here, in a normal state, the switching claw 312 is arranged to directly connect the switchback transport path 313 and the second transport path 311 (the first switching posture, see the solid line in FIG. 2). When the original G, the original image of which has been read by the original reading portion 200, is transported in the transport direction Y1, the leading end of the original G (the downstream side end in the transport direction Y1) pushes up the switching claw 312 to guide the original G to the switchback transport path 313 (the second switching posture, see the dashed line in FIG. 2). The switching claw 312 is capable of freely swaying about a swaying axis Q along the axis line direction of the reverse roller pair 310 such that a claw portion 312a drops due to its own weight, thereby blocking the first transport path 303 between the downstream side transport roller pair 305 and the reverse roller pair 310 to take the first switching posture. When the trailing end of the original G is positioned in the switchback transport path 313, and the original G is transported in reverse in a reverse-transport direction (direction of arrow Y2 in the drawings) that is an opposite direction to the transport direction Y1 of the original G by the reverse roller pair 310 rotating in the reverse direction, the switching claw 312 guides the original G to the second transport path 311.

Note that the size of the original G placed on the original tray 301 is detected by an original size sensor 314 disposed in an original placement portion of the original tray 301. Whether or not an original G is placed on the original tray 301 is detected by an original detecting sensor 315 disposed near the pickup roller 306 of the original placement portion of the original tray 301. Also, in a stopped state, the upstream side transport roller pair 304 causes the leading end of the original G transported by the separation roller 307 to abut for alignment, and is driven to rotate in accordance with the timing for reading. The thus transported original G is detected by a transport sensor 316 disposed on the further downstream side than the second transport path 311 and also on the further downstream side than the upstream side transport roller pair 304 in the transport direction Y1 of the first transport path 303. The original G discharged by the reverse roller pair 310 is detected by a discharge sensor 317 disposed near the reverse roller pair 310 on the discharge side relative to the reverse roller pair 310. Note that the transport system rollers such as the transport roller pairs 304 and 305 and the reverse roller pair 310 are driven by a transport system drive portion, which is not shown in the figure.

In the present embodiment, the original reading portion 200 further includes a white reference member (here, a white reference plate) 318 for performing reading during shading correction for making a digital image signal value constant. Specifically, the white reference member 318 is a reading guide member provided in a position opposite to the original reading glasses 201a. That is, the white reference member 318 also functions as a reading guide that guides the transported original G in conjunction with the original reading glasses 201a.

In the image reading apparatus 100 described above, when an instruction to read the original G in the stationary original reading arrangement is given, the light source unit 210 moves to one side in the sub-scanning direction Y at a constant speed while irradiating light to the original G placed on the platen glass 201b therethrough, thereby scanning the image of the original G. At the same time, the mirror unit 203 also moves to the one side in the sub-scanning direction Y at a moving speed that is half the moving speed of the light source unit 210.

Light reflected from the original G illuminated by the light source unit 210 is reflected by the first mirror 230 provided in the light source unit 210, and then the optical path of this reflected light is converted by 180° by the second and third mirrors 203a and 203b of the mirror unit 203. Light reflected by the third mirror 203b forms an image on the light-receiving face 205d of the photoelectric conversion element 205 via the condensing lens 204, and here, the original image light is read and converted into an analog signal.

Meanwhile, when an instruction to read the original image on the original G in the moving original reading arrangement is given, the original G is transported by the automatic original feeder 300 to one side in the sub-scanning direction Y so as to pass through a portion above the position V indicated in FIG. 2, while the light source unit 210 stays in the position V indicated in FIG. 2. That is, the originals G placed on the original tray 301 are taken out by the pickup roller 306, separated by the separation roller 307 and the separation member 308 into individual sheets, and transported to the first transport path 303. After the transportation of the original G that has been transported to the first transport path 303 is confirmed by the transport sensor 316, the leading end of the original G is aligned to prevent slanted transportation and sent out in a prescribed timing for reading by the upstream side transport roller pair 304, the front and back faces are inverted, and the original G is transported to the original reading glasses 201a.

Onto one face of the original G that has passed through above the original reading glasses 201a, light from the light source unit 210 is irradiated via the original reading glasses 201a and reflected by the one face. The light reflected by the one face of the original G is reflected by the first mirror 230 similarly to the above-described stationary original reading arrangement, and then the optical path of the reflected light is converted by 180° by the second and third mirrors 203a and 203b in the mirror unit 203. The reflected light forms an image on the light-receiving face 205d of the photoelectric conversion element 205 via the condensing lens 204, and here, the original image is read and converted to an analog signal. Note that in the case of duplex reading that will be described later, the same reading operation by the photoelectric conversion element 205 as described above is performed, and the description thereof will be omitted below.

The original G that has been read is drawn off the original reading glasses 201a by the downstream side transport roller pair 305, and discharged onto the discharge tray 302 by the reverse roller pair 310, which is capable of forward and reverse rotation, via the switchback transport path 313 of the first transport path 303.

Also, in the case where both faces of the original G are read, the original G one face of which has been read is not discharged to the discharge tray 302, but transported such that its trailing end is positioned in the switchback transport path 313. The original G is then transported in reverse in the reverse-transport direction Y2 by the reverse roller pair 310 rotating in the reverse direction, and guided to the second transport path 311 by the switching claw 312 in the first switching posture. The original G guided to the second transport path 311 is again returned to the first transport path 303 via the second transport path 311 and, as a result, the original G is transported by the upstream side transport roller pair 304 with the front and back faces inverted and passes through above the original reading glasses 201a, and the other face of the original G is read. The original G both faces of which have been read again returns to the first transport path 303 and is thus transported by the transport roller pairs 304 and 305 with the front and back faces inverted. Thereafter, the original G passes through the switchback transport path 313 of the first transport path 303, and is discharged to the discharge tray 302 via the reverse roller pair 310 rotating in the forward direction.

Figure 3A:
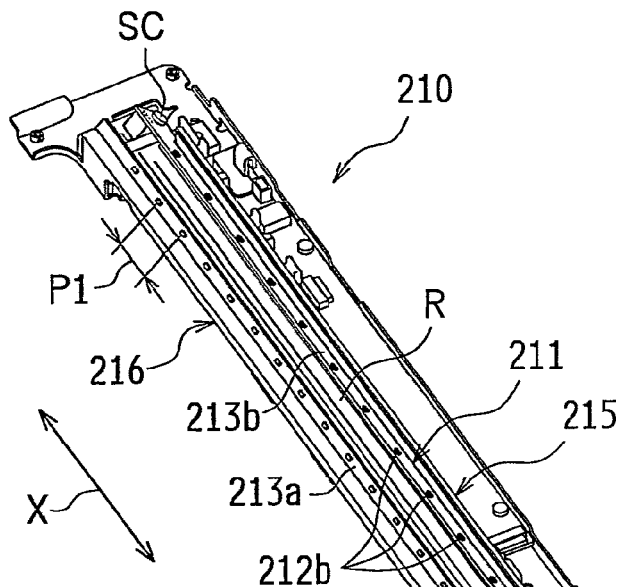
FIG. 3(a) is an oblique view thereof and FIG. 3(b) is an exploded oblique view thereof.
Figure 3B:
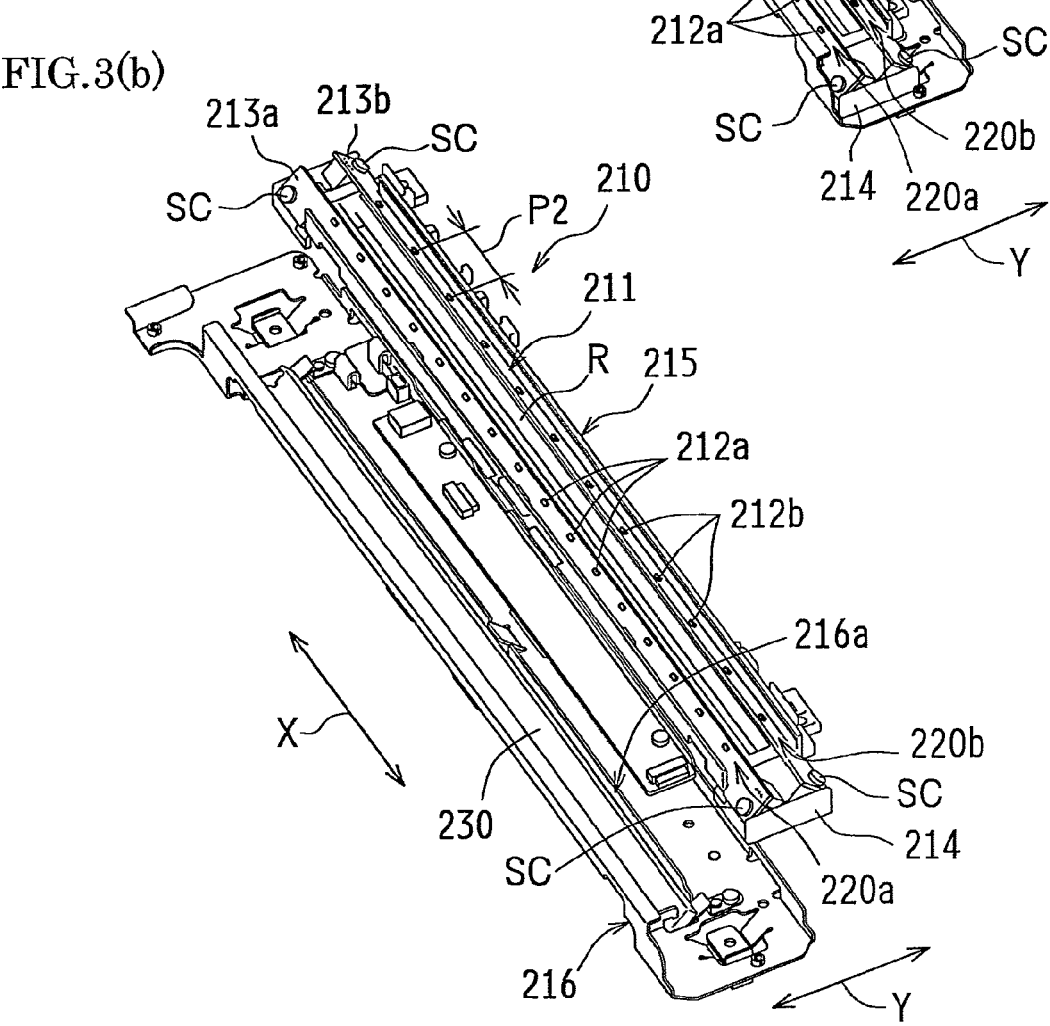
Figure 4A:
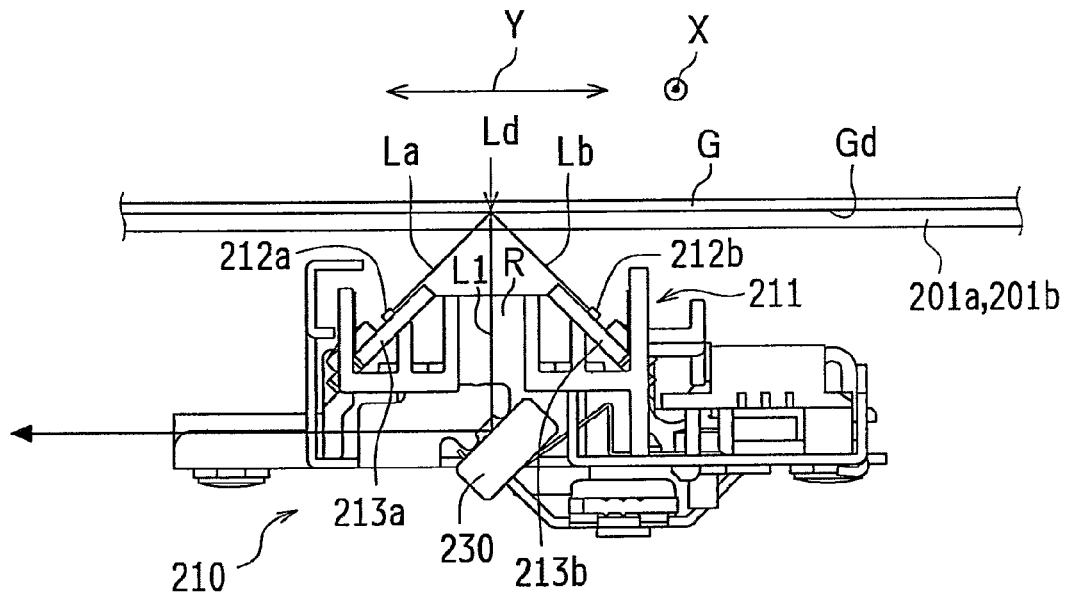
FIG. 4(a) is a side view of the light source unit.
Figure 4B:
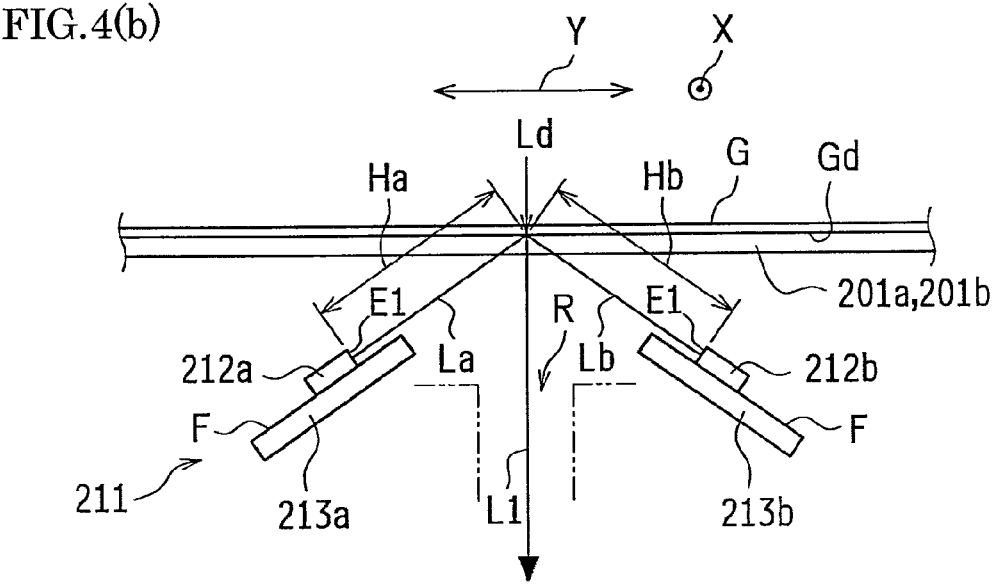
FIG. 4(b) is a side view of the light source.

FIG. 3 are diagrams showing a schematic configuration of the light source unit 210. FIG. 3(a) is an oblique view thereof, and FIG. 3(b) is an exploded oblique view thereof. FIG. 4 are diagrams showing a schematic configuration of the light source 211 in the light source unit 210. FIG. 4(a) is a side view of the light source unit 210, and FIG. 4(b) is a side view of the light source 211. Note that FIG. 4 also show the original reading glasses 201a, the platen glass 201b and the original G.

In the present embodiment, the light source 211 includes a plurality of rows of light source groups (specifically, the first light source group 220a and the second light source group 220b). The first light source group 220a and the second light source group 220b are arranged on both sides of a fixed light irradiation region Ld on the original G, which extends in the main scanning direction X, in the sub-scanning direction Y along the irradiated face Gd perpendicular to the main scanning direction X. The first light source group 220a and the second light source group 220b include a plurality of light-emitting elements (specifically, the first light-emitting elements 212a, . . . and the second light-emitting elements 212b, . . . ), respectively. The first light-emitting elements 212a . . . and the second light-emitting elements 212b are arranged such that the respective optical axes La, . . . and Lb, . . . are perpendicular to the main scanning direction X.

Specifically, in the light source 211, the first light source group 220a having the plurality of first light-emitting elements 212a, . . . is arranged in the main scanning direction X on one side in the sub-scanning direction Y, and the second light source group 220b having the plurality of second light-emitting elements 212b, . . . is arranged in the main scanning direction X on the other side.

The light source 211 includes a plurality of substrates (specifically, the first light source substrate 213a and the second light source substrate 213b) that extend in the main scanning direction X and are parallel to each other. The plurality of first light-emitting elements 212a, . . . are mounted on the first light source substrate 213a, and the plurality of second light-emitting elements 212b, . . . are mounted on the second light source substrate 213b.

More specifically, the light source unit 210 includes a light-emitting element array unit 215 and a mirror base unit 216 to which the light-emitting element array unit 215 is provided.

The light-emitting element array unit 215 includes the first light-emitting elements 212a, . . . , the first light source substrate 213a, the second light-emitting elements 212b, . . . , the second light source substrate 213b, and a substrate base 214 on which the first light source substrate 213a and the second light source substrate 213b are disposed.

Specifically, the first light source substrate 213a and the second light source substrate 213b are arranged on the substrate base 214 such that their longitudinal direction is aligned with the main scanning direction X. The first and second light source substrates 213a and 213b are fixed at a predetermined interval therebetween in the sub-scanning direction Y to the substrate base 214 at both ends in the main scanning direction X using fixing members SC such as screws. In this manner, the first light-emitting elements 212a, . . . and the second light-emitting elements 212b, . . . are disposed respectively along the main scanning direction X on both sides of the light irradiation region Ld in the sub-scanning direction Y.

Further, in the substrate base 214, an opening (here, a slit) R that extends in the main scanning direction X and causes light L1 reflected from the original G to pass through between the first light source substrate 213a and the second light source substrate 213b is formed. The slit R is located below the light irradiation region Ld serving as an original reading position during original reading. The first light source group 220a and the second light source group 220b are respectively arranged on both sides of the slit R in its short direction.

The mirror base unit 216 includes the first mirror 230. Specifically, the first mirror 230 is supported in a state of being inserted in an opening 216a of the mirror base unit 216, the opening 216a extending in the main scanning direction X, such that the light reflected on the irradiated face Gd of the original G is guided to the second mirror 203a in the mirror unit 203 via the slit R provided in the substrate base 214.

Also, in the present embodiment, as shown in FIG. 4(b), each of the plurality of first light-emitting elements 212a, . . . and the second light-emitting elements 212b, . . . includes an emission face E1 for performing side light emission for irradiating light such that the optical axes La, . . . and Lb, . . . are parallel to light-emitting element arrangement faces F of the first light source substrate 213a and the second light source substrate 213b on which the first light-emitting elements 213a and the second light-emitting elements 213b are mounted. Specifically, the first light source substrate 213a on which the first light-emitting elements 212a, . . . are mounted and the second light source substrate 213b on which the second light-emitting elements 212b, . . . are mounted are arranged, in the side view, in an inverted "V" shape where the side opposite to the original G is widened such that the optical axes La, . . . and Lb, . . . are directed to the light irradiation region Ld. Note that the light irradiation region Ld is located in the middle between the first light source substrate 213a and the second light source substrate 213b.

Further, top face light emission for irradiating light such that the optical axes La, . . . and Lb, . . . are perpendicular to the arrangement face F of the first light source substrate 213a and the second light source substrate 213b on which the light-emitting elements are mounted may also be performed.

Note that in FIG. 3, reference character P1 represents a pitch between the first light-emitting elements 212a, . . . and reference character P2 represents a pitch between the second light-emitting elements 212b, . . . . In FIG. 4(b), reference character Ha represents a first optical axis distance that is a distance of an optical axis La from each of the first light-emitting elements 212a, . . . to the light irradiation region Ld, and reference character Hb represents a second optical axis distance that is a distance of an optical axis Lb from each of the second light-emitting elements 212b, . . . to the light irradiation region Ld.

Figure 5:
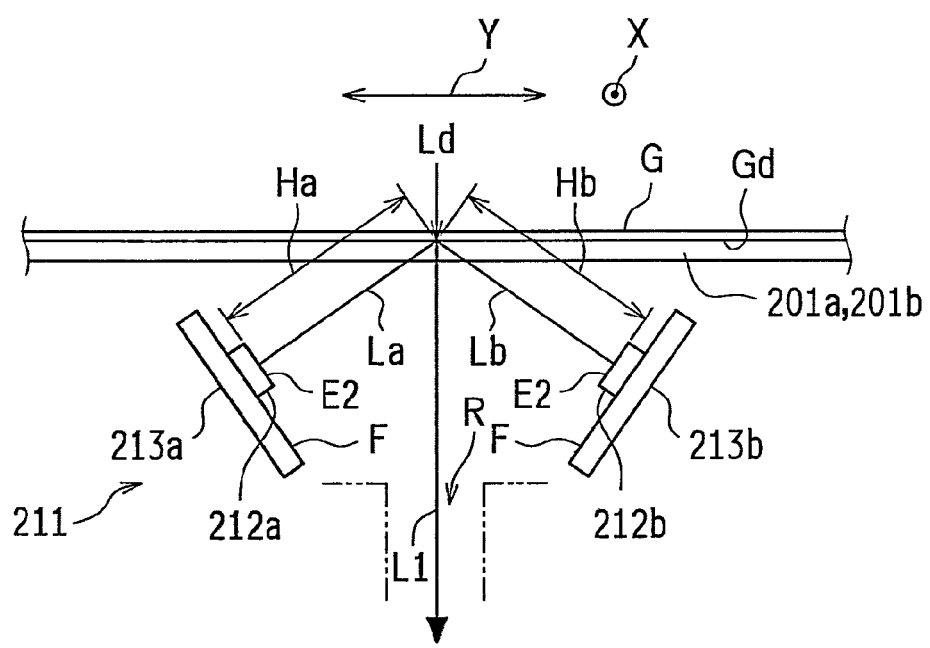
FIG. 5 is a schematic side view showing an example where first light-emitting elements and second light-emitting elements perform top face light emission.

FIG. 5 is a schematic side view showing an example where the first light-emitting element 212a, . . . and the second light-emitting elements 212b, . . . perform top face light emission.

As shown in FIG. 5, in the case where each of the first light-emitting elements 212a, . . . and the second light-emitting elements 212b, . . . has the emission face E2 for performing top-face light emission, the first light source substrate 213a and the second light source substrate 213b can be arranged in a "V" shape where the original G side is widened such that the optical axes La, . . . and Lb, . . . are directed to the light irradiation region Ld. Note that the light irradiation region Ld is located in the middle between the first light source substrate 213a and the second light source substrate 213b.

As described above, the arrangement configurations of the light-emitting elements shown in FIGS. 4 and 5 are available. In the case where the light-emitting elements perform either side light emission or top-face light emission, by using an appropriate configuration respectively for side light emission and top-face light emission in accordance with the arrangement configuration of constituent parts of the light source unit 210, unused space in the light source unit 210 can be effectively used.

FIG. 6 is a schematic plan view showing an example of a state of arrangement of the first light source group 220a and the second light source group 220b mounted on the first light source substrate 213a and the second light source substrate 213b, respectively.

As shown in FIG. 6, the light source 211 irradiates light from the first light source group 220a and the second light source group 220b respectively arranged on the first light source substrate 213a and the second light source substrate 213b to the irradiated face Gd (specifically, the light irradiation region Ld) of the original G. The first light source group 220a and the second light source group 220b includes the plurality of first light-emitting elements 212a(1), . . . 212a(i) (i is an integer of 2 or larger) and the plurality of second light-emitting elements 212b(1), . . . 212b(j) (j is an integer of 2 or larger), respectively. In the present embodiment, i is 16 and j is 12. In the following description, it is assumed that i is 16 and j is 12.

All of the first light-emitting elements 212a(1), . . . 212a(16) and the second light-emitting elements 212b(1), . . . 212b(12) are light-emitting diode (LED) elements. The first and second light-emitting elements 212a(1), . . . 212a(16) and 212b(1), . . . 212b(12) have strong directional characteristics in a predetermined direction. The directions of the light irradiated from the first and second light-emitting elements 212a(1), . . . 212a(16) and 212b(1), . . . 212b(12) with the strongest luminous flux are the optical axes La, . . . and Lb, . . . . Note that the first and second light-emitting elements 212a(1), . . . 212a(16) and 212b(1), . . . 212b(12) are of the same type (model).

The first light-emitting elements 212a(1), . . . 212a(16) and the second light-emitting elements 212b(1), . . . 212b(12) irradiate light to the light irradiation region Ld side. The light irradiation region Ld serves as the original reading position. Note that all first optical axis distances Ha (see FIG. 4(b)) are the same distance. All second optical axis distances Hb (see FIG. 4(b)) are also the same distance. Here, the first optical axis distance Ha and the second optical axis distance Hb are the same distance.

Arrangement Configuration of the Light-Emitting Elements in the Light Source Unit Next, the arrangement configuration of the first light-emitting elements 212a(1), . . . 212a(16) and the second light-emitting elements 212b(1), . . . 212b(12) in the light source 211 is described.

The first light-emitting elements 212a(1), . . . 212a(16) in the first light source group 220a are arranged at a constant pitch (specifically, P1) in the same light source group (specifically, 220a), and the second light-emitting elements 212b(1), . . . 212b(12) in the second light source group 220b are arranged at a constant pitch (specifically, P2) in the same light source group (specifically, 220b). Further, the first light-emitting elements 212a(1), . . . 212a(16) and the second light-emitting elements 212b(1), . . . 212b(12) are arranged at different pitches (P1<P2) from each other between the first light source group 220a and the second light source group 220b. Specifically, the pitch P1 is 18 mm, and the pitch P2 is 24 mm. Note that pitch P1 is a distance between the center (light irradiating portion) of each first light-emitting element in the main scanning direction X, and the pitch P2 is a distance between the center (light irradiating portion) of each second light-emitting element in the main scanning direction X. In FIG. 6, reference characters K1, . . . Kn-1, Kn represent optical axis irradiating positions that are irradiating positions on the optical axes La, . . . and Lb, . . . to the irradiated face Gd in the main scanning direction X.

FIG. 7 are graphs showing an example of illumination distributions α1, α2, and α3 in the light irradiation region Ld in the main scanning direction X in the case where all light-emitting elements have the same amount of light. FIG. 7(a) shows the illumination distribution α1 in the case where only the optical axes La, . . . of the first light-emitting elements 212a(1), . . . 212a(16) in the first light source group 220a are irradiated to the light irradiation region Ld. FIG. 7(b) shows the illumination distribution a2 in the case where only the optical axes Lb, . . . of the second light-emitting elements 212b(1), . . . 212b(12) in the second light source group 220b are irradiated to the light irradiation region Ld. FIG. 7(c) shows the illumination distribution a3 in the case where the optical axes La, . . . and Lb, . . . of the first and second light-emitting elements 212a(1), . . . 212a(16) and 212b(1), . . . 212b(12) in the first and second light source groups 220a and 220b are irradiated to the light irradiation region Ld. In FIGS. 7(a) and 7(b), a median illuminance of uneven illuminance caused due to repeated areas of brightness and darkness in the main scanning direction X on the irradiated face Gd (specifically, light irradiation region Ld) on the original G is M[Lx]. This also applies to FIGS. 16(a) and 16(b) described later. Also in FIG. 7, the light-emitting element at one end (the left end in FIG. 6) serves as an origin of the horizontal axis, reference characters β1 to β16 represent peaks of bright areas, and reference characters γ1 to γ15 represent troughs of dark areas. This also applies to FIGS. 9, 16, 17, and 20 described later.

As shown in FIG. 7, the illumination distribution a3 (see FIG. 7(c)) showing uneven illuminance is an illumination distribution obtained by combining (adding) the illumination distribution α1 (see FIG. 7(a)) of the first light source group 220a and the illumination distribution a2 (see FIG. 7(b)) of the second light source group 220b, and the amplitude and the cycle of fluctuation thereof are not regular.

As described above, in the present embodiment, the first light-emitting elements 212a(1), . . . 212a(16) in the first light source group 220a are arranged at a constant pitch (specifically, P1) in the same light source group (specifically, 220a), and the second light-emitting elements 212b(1), . . . 212b(12) are arranged at a constant pitch (specifically, P2) in the same light source group (specifically, 220b), and the pitches in the first light source group 220a and the second light source group 220b are different from each other (P1<P2). Accordingly, the amplitude and the cycle of fluctuation of the illumination distribution a3 (see FIG. 7(c)) on the irradiated face Gd of the original G in the main scanning direction X can be made irregular, and it is thus possible to make uneven illuminance less noticeable.

In the present embodiment, at least one (specifically, K1, K7, . . . Kn-5) of the optical axis irradiation positions K1, . . . Kn-1, Kn (see FIG. 6) is the point in common for the first light source group 220a and the second light source group 220b. Note that n is an integer of 3 or larger. In the present embodiment, n is 24. In the following description, it is assumed that n is 24. In other words, at least one, or K1, K7, . . . , K19, of the optical axis irradiation positions of the first light-emitting elements 212a(1), . . . 212a(16) in the first light source group 220a matches at least one, or K1, K7, . . . , K19, of the optical axis irradiation positions of the second light-emitting elements 212b(1), . . . 212b(12) in the second light source group 220b.

More specifically, every fourth optical axis La of the first light-emitting elements 212a(1), . . . 212a(16) and every third optical axis Lb of the second light-emitting elements 212b(1), . . . 212b(12) are located on the same assumed plane orthogonal to the main scanning direction X.

With this configuration, it is possible to obtain the common optical axis irradiation positions K1, K7, . . . K19 at every length of the least common multiple (specifically, 72 mm) of the lengths of the pitches (specifically, P1=18 mm and P2=24 mm) of the first light source group 220a and the second light source group 220b. Thus, the illuminance can be maximized at the optical axis irradiation positions K1, K7, . . . K19 at the same points in common for the first light source group 220a and the second light source group 220b when all light-emitting elements have the same amount of light. It is thus possible to suppress at a low level the illuminance at the peaks β2, β3, β4, β6, . . . β12, β14, β15 and β16 in the bright areas other than the peaks β1, β5, . . . β13 at the common optical axis irradiation positions K1, K7, . . . K19 in the illumination distribution a3 (see FIG. 7(c)), and further reduce the number of the light-emitting elements for which the amount of light needs to be set.

Furthermore, in the present embodiment, the pitch P1 between the first light-emitting elements 212a(1), . . . 212a(16) in the first light source group 220a and the pitch P2 between the second light-emitting elements 212b(1), . . . 212b(12) in the second light source group 220b respectively have the lengths other than integral multiplications of the pitch in the other light source groups (see FIG. 6). With this configuration, it is possible to reduce the light-emitting elements with the optical axis irradiation positions at the points in common for the first light source group 220a and the second light source group 220b and increase the number of optical axis irradiation positions.

Figure 8:
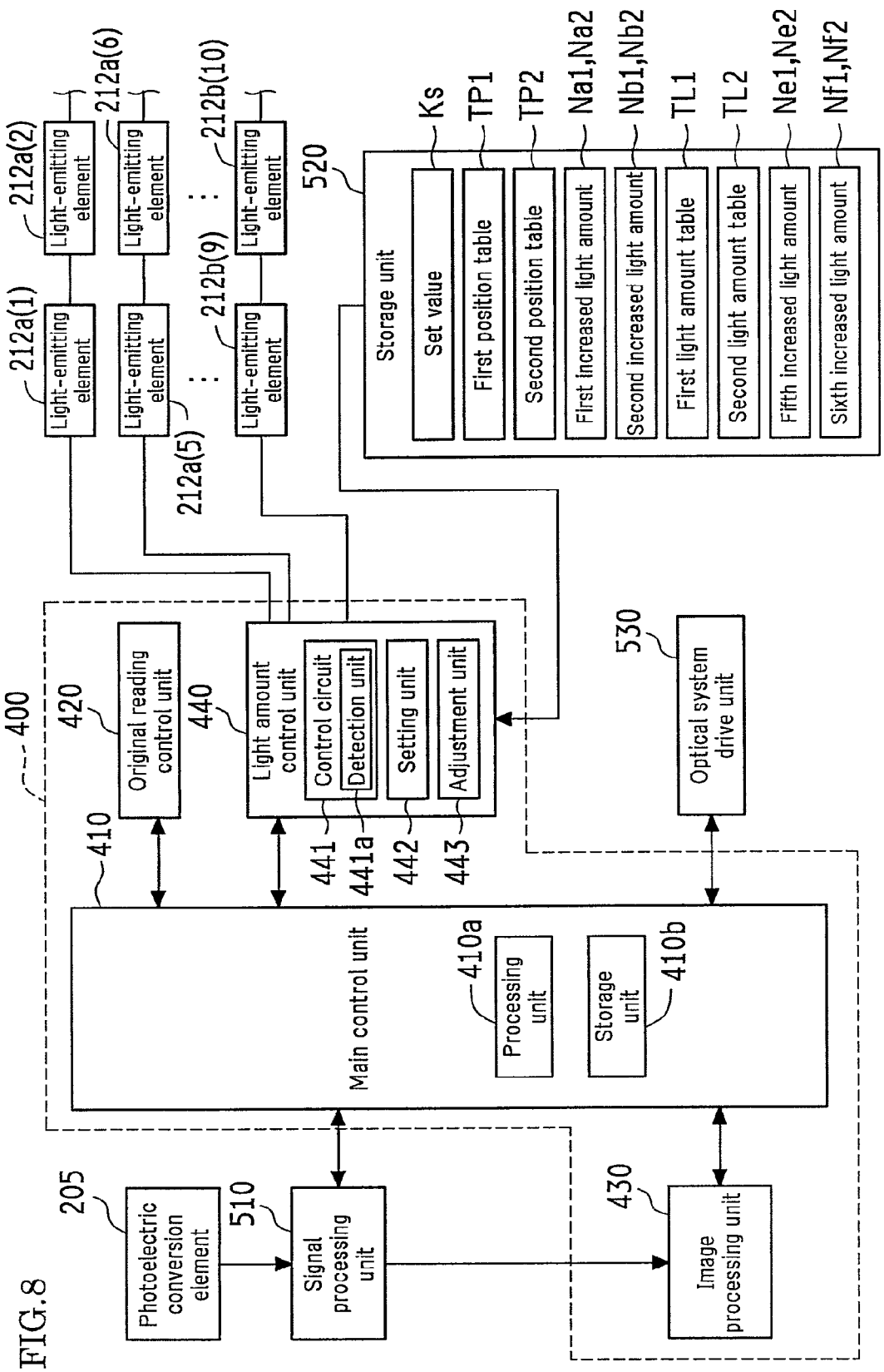
FIG. 8 is a diagram showing a schematic configuration of a control system in the image reading apparatus according to the present embodiment, which is a control block diagram mainly showing a control unit in the image reading apparatus.

FIG. 8 is a diagram showing a schematic configuration of a control system in the image reading apparatus 100 according to the present embodiment, which is a control block diagram mainly showing a control unit 400 in the image reading apparatus 100.

As shown in FIG. 8, the image reading apparatus 100 according to the present embodiment further includes the control unit 400 that governs the control of the entire image reading apparatus 100, a signal processing unit 510 and a storage unit 520.

The control unit 400 has a main control unit 410, an original reading control unit 420, an image processing unit 430, and a light amount control unit 440.

The main control unit 410 is connected to the original reading control unit 420, the image processing unit 430, the light amount control unit 440, the signal processing unit 510, and the optical system drive unit 530.

Specifically, the main control unit 410 has a microcomputer including a processing unit 410a such as a CPU and a storage unit 410b including memories such as a ROM and a RAM. In the image reading apparatus 100, various constituents are controlled by the processing unit 410a in the main control unit 410 loading control programs stored in advance in the ROM in the storage unit 410b onto the RAM in the storage unit 410b and executing them. Note that the main control unit 410 is instructed by a control unit (not shown) provided in the image forming apparatus D that controls the entire image forming operation.

The original reading control unit 420 controls, based on an instruction signal from the main control unit 410, operation of reading of the original G by the photoelectric conversion element 205.

The signal processing unit 510, which is connected to the photoelectric conversion element 205, processes a signal from the photoelectric conversion element 205 based on an instruction signal from the main control unit 410. The signal processing unit 510 here is an analog front end (AFE) IC, and performs signal processing such as OB (Optical Blank) clamp, CDS (Correlated Double Sampling), AGC (Auto Gain Control) and ADC (Analog-to-Digital Conversion) on an output signal (image capturing signal) from the photoelectric conversion element 205. The signal processing unit 510 includes a circuit for converting an analog signal from the photoelectric conversion element 205 into a digital signal (here, an 8-bit digital image signal).

The image processing unit 430 performs, based on an instruction signal from the main control unit 410, various kinds of image processing on the digital signal converted by the signal processing unit 510, and here, it is an image-processing ASIC (Application Specific Integrated Circuit).

The light amount control unit 440 includes a control circuit 441, a setting unit 442, and an adjustment unit 443. The light amount control unit 440, which is a light-emitting element controller here, is connected to the first and second light-emitting elements 212a(1), ... 212a(16) and 212b(1), ..., 212b(12). The light amount control unit 440 controls, based on an instruction signal from the main control unit 410, on/off and amounts of outgoing light (specifically, current value) of the first and second light-emitting elements 212a(1), ..., 212a(16) and 212b(1), ... 212b(12). The control circuit 441 further includes a detection unit 441a. Note that the detection unit 441a and the adjustment unit 443, and first and second position tables TP1 and TP2, first increased light amounts Na1 and Na2, second increased light amounts Nb1 and Nb2, first and second light amount tables TL1 and TL2, fifth increased light amounts Ne1 and Ne2, and sixth increased light amounts Nf1 and Nf2 stored in the storage unit 520 will be described later.

The setting unit 442 sets the amounts of light of the first light-emitting elements 212a(1), ... 212a(16) in the first light source group 220a and the second light-emitting elements 212b(1), ... 212b(12) in the second light source group 220b to a set value Ks stored in advance in the storage unit 520. The set value Ks stored in advance in the storage unit 520 is a value used to change the amounts of light of the first light-emitting elements 212a(1), ... 212a(16) in the first light source group 220a and the second light-emitting elements 212b(1), ... 212b(12) in the second light source group 220b to an amount of light with which the illumination distribution α3 shown in FIG. 7(c) falls within an uneven illuminance reference range.

Here, the "uneven illuminance reference range" refers to a range between an upper limit value and a lower limit value relative to a degree of illuminance difference between each peak β1, ... β15 (see FIG. 7(c)) in bright areas and the following trough γ1, ... γ15 (see FIG. 7(c)) in the dark areas in repeated areas of brightness and darkness in the main scanning direction X on the irradiated face Gd of the original G. Examples of the degree of the illuminance difference may include a value (slope) obtained by subtracting the illuminance at each trough γ1, ... γ15 in dark areas from the illuminance at the adjoining peak β1, ... β15 in bright areas in the illumination distribution a3, and dividing the result of this subtraction by a distance between the position corresponding to each peak β1, ... β15 in the bright areas and the position corresponding to the following trough γ1, ... γ15 in the dark areas. Other examples of the degree of the illuminance difference may include a value (ripple ratio) obtained by subtracting the illuminance at each trough γ1, ... γ15 in dark areas from the illuminance at the adjoining peak β1, ... β15 in bright areas in the illumination distribution α3, and dividing the result of this subtraction by an average value of the illuminance at each peak β1, ... β15 in the bright areas and the illuminance at the following trough γ1, ... γ15 in the dark areas.

If the illumination distribution α3 (see FIG. 7(c)) falls out of the predetermined uneven illuminance reference range in the case where all of the first light-emitting elements 212a(1), ... 212a(16) in the first light source group 220a and the second light-emitting elements 212b(1), ... 212b(12) in the second light source group 220b have the same amount of light, those light-emitting elements are set by the setting unit 442 to have the amount of light with which the illumination distribution α3 falls within the reference range. In other words, if the illumination distribution α3 falls out of the reference range, the amounts of light of the first light-emitting elements 212a(1), ... 212a(16) and the second light-emitting elements 212b(1), ... 212b(12) are set by reducing or increasing those amounts of light such that the illumination distribution α3 falls within the reference range. It is thus possible to suppress uneven illuminance and make the uneven illuminance even less noticeable.

Figure 9:
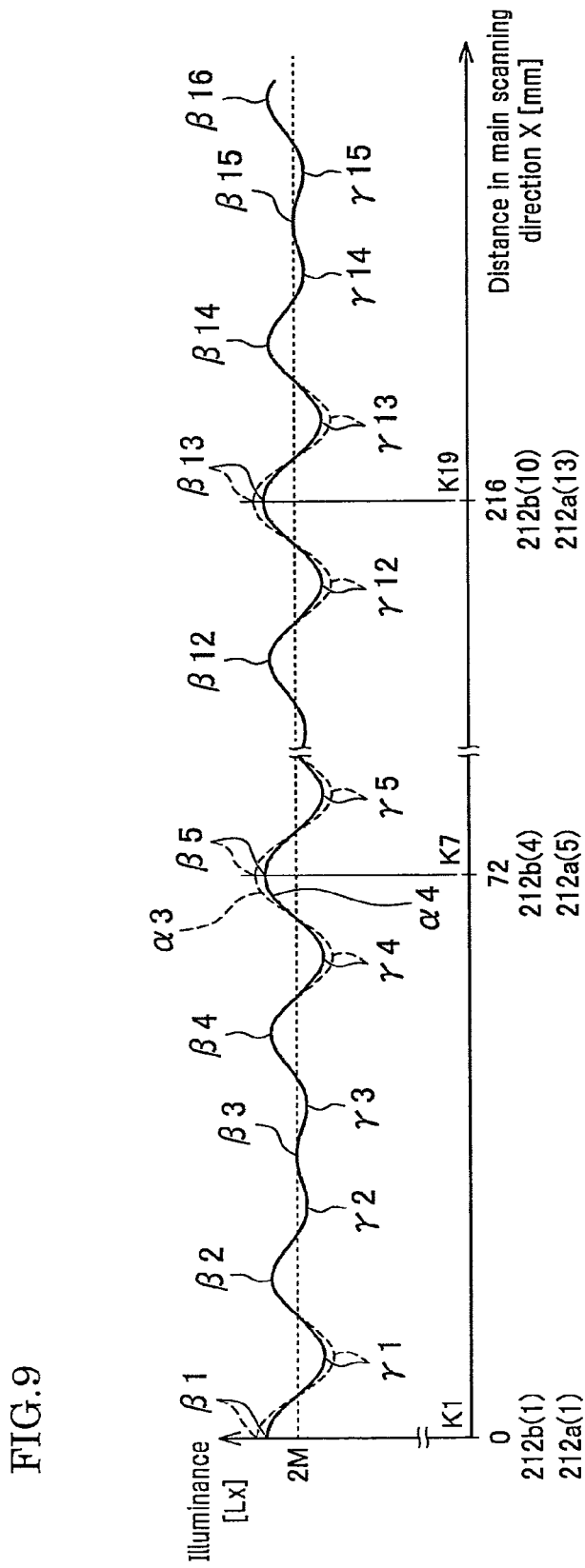
FIG. 9 is a graph showing an illumination distribution in the case where amounts of light of the first and second light-emitting elements are set to the amount of light with which the illumination distribution shown in FIG. 7(c) falls within an uneven illuminance reference range.

FIG. 9 is a graph showing an illumination distribution α4 in the case where the amounts of light of the first light-emitting elements 212a(1), ... 212a(16) and the second light-emitting elements 212b(1), ... 212b(12) are set to the amount of light with which the illumination distribution α3 shown in FIG. 7(c) falls within the uneven illuminance reference range. Note that in FIG. 9, the illumination distribution α3 shown in FIG. 7(c) is indicated by a broken line.

In the example shown in FIG. 9, the amounts of light of the light-emitting elements having the optical axis irradiation positions at the points in common for the first light source group 220a and the second light source group 220b are reduced. Specifically, the amounts of light of the first light-emitting elements 212a(1), 212a(5), 212a(9), and 212a(13) and/or the second light-emitting elements 212b(1), 212b(4), 212b(7), and 212b(10) that respectively have the common optical axis irradiation positions are lowered.

As in the present embodiment, since at least one (specifically, K1, K7, ... K19) of the optical axis irradiation positions (specifically, K1 to K24) is the point in common, it is possible to reduce the light-emitting elements that need to be set (adjusted) as much as possible and adjust the illumination distribution α3 shown in FIG. 7(c) to a distribution within the uneven illuminance reference range (for example, only by reducing the amounts of light of the light-emitting elements having the common optical axis irradiation positions K1, K7, ... K19). With this configuration, the operation of adjusting the amounts of light in advance can be simplified.

The setting unit 442 can be set in advance at a parts manufacturer or the like with respect to the amounts of light of the light-emitting elements in the plurality of rows of light source groups using a set value obtained through design simulation for each light-emitting element and/or an adjustment value for each light-emitting element obtained with a single or a plurality of actual sample device(s).

Figure 10:
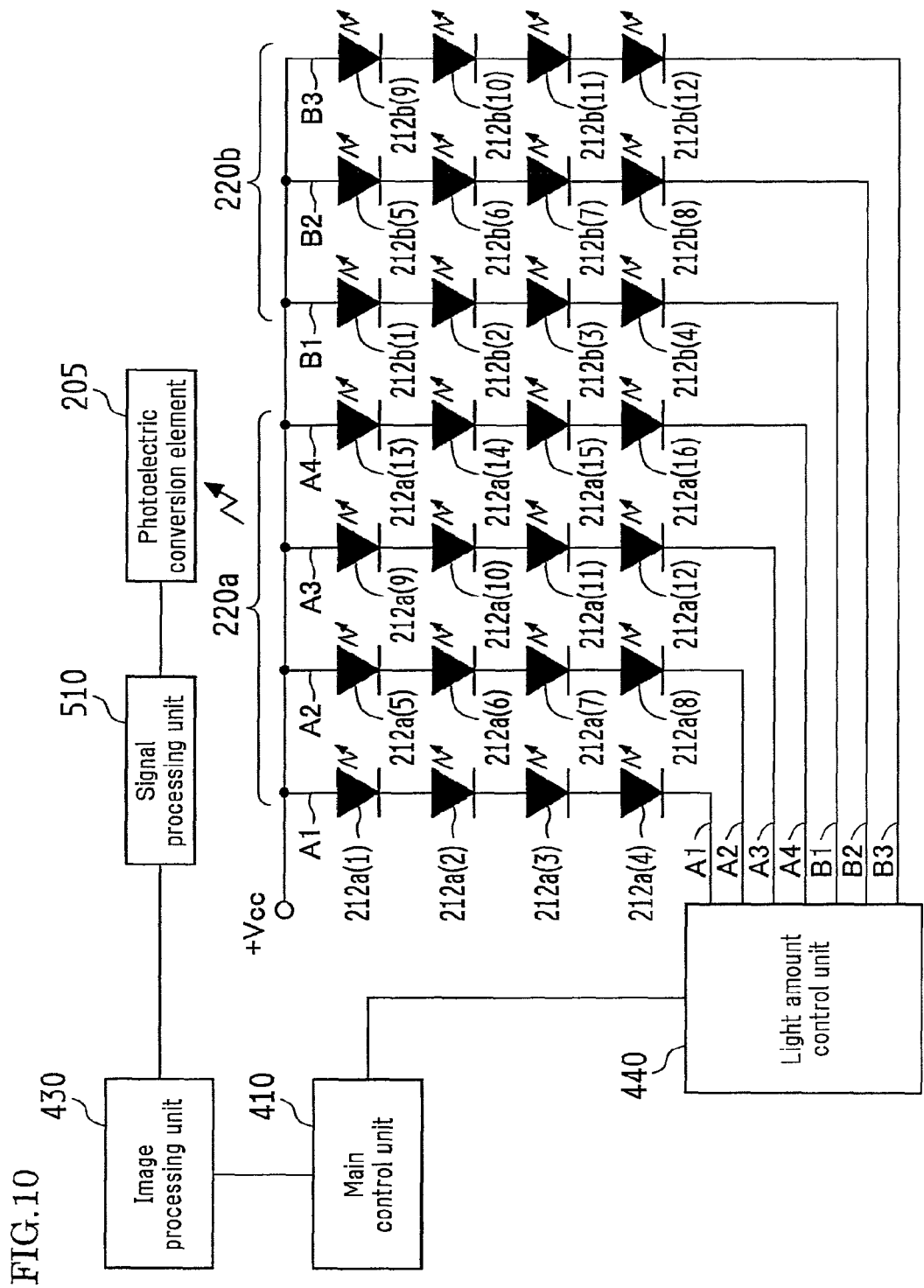
FIG. 10 is a wiring diagram specifically showing a light amount control unit in the block diagram shown in FIG. 8.

FIG. 10 is a wiring diagram specifically showing the light amount control unit 440 section in the block diagram shown in FIG. 8. Note that in FIG. 10, the image reading control unit 420, the storage unit 520, the optical system drive unit 530 and the like are not shown.

As shown in FIG. 10, the first light source group 220a includes a plurality of (specifically, four) first wires (specifically, A1, A2, A3 and A4). The second light source group 220b includes a plurality of (specifically, three) second wires (specifically, B1, B2 and B3).

The four first wires A1, A2, A3 and A4 connect the plurality of (specifically, 16) first light-emitting elements 212a(1) to 212a(16) in series in units of a plurality thereof (specifically, in units of four). The three second wires B1, B2 and B3 connect the plurality of (specifically, 12) second light-emitting elements 212b(1) to 212b(12) in series in units of a plurality thereof (specifically, in units of four). One ends of the first wires A1, A2, A3 and A4 and the second wires B1, B2 and B3 are connected to the light amount adjustment unit 440, and the other ends are connected to a power source (power supply voltage+Vcc). The light amount control unit 440 individually adjusts, in response to an instruction signal from the main control unit 410, the first light-emitting elements 212a(1) to 212a(4), 212a(5) to 212a(8), 212a(9) to 212a(12) and 212a(13) to 212a(16) connected in units of four respectively to the first wires A1, A2, A3 and A4. The light amount control unit 440 also individually adjusts, in response to an instruction signal from the main control unit 410, outgoing amounts of light of the second light-emitting elements 212b(1) to 212b(4), 212b(5) to 212b(8), and 212b(9) to 212b(12) connected in units of four to the second wires B1, B2 and B3. With this configuration, the amounts of light of the plurality of (specifically, 16) first light-emitting elements 212a(1) to 212a(16) and/or the plurality of (specifically, 12) second light-emitting elements 212b(1) to 212b(12) can be set to the amount of light with which the illumination distribution α3 shown in FIG. 7(c) falls within the uneven illuminance reference range in units of the plurality of light-emitting elements (specifically, in units of four). Thus, the operation of adjusting the amounts of light in advance can be simplified.

Incidentally, in the case where at least one of a plurality of rows of light source groups (specifically, the first and second light source groups 220a and 220b) has a plurality of wires (specifically, the first and second wires A1 to A4 and B1 to B3) each connecting a plurality of light-emitting elements (specifically, the first and second light-emitting elements 212a(1) to 212a(16) and 212b(1) to 212b(12)) in series in units of a plurality thereof, if the plurality of light-emitting elements (for example, the first light-emitting elements 212a(1) to 212a(4)) on a single wire among the plurality of wires (for example, the four first wires A1 to A4) are continuously arranged in the main scanning direction X and the light-emitting elements (for example, the first light-emitting elements 212a(1) to 212a(4)) connected in series in units of the plurality thereof become unlighted, the light-emitting elements (for example, the first light-emitting elements 212a(1) to 212a(4)) that are continuous in the main scanning direction X become continuously unlighted in the main scanning direction X. Accordingly, the width in the main scanning direction X of an area where the illuminance declines on the irradiated face Gd of the original G becomes large, and the uneven illuminance becomes noticeable.

From this viewpoint, in the present embodiment, the first and second light-emitting elements 212a(1) to 212a(16) and 212b(1) to 212b(12) are arranged as described below.

Figure 11:
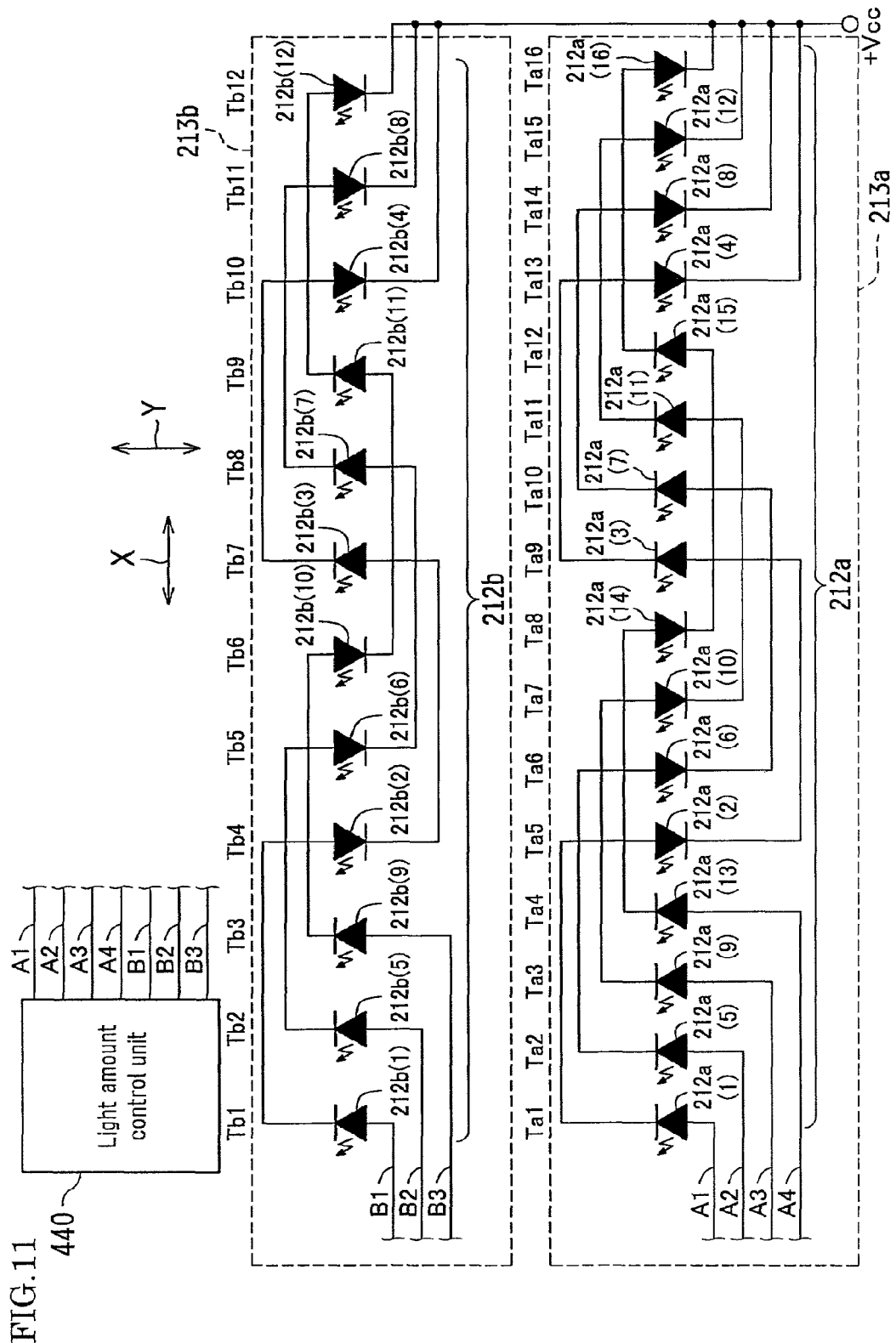
FIG. 11 is a circuit diagram showing an arrangement configuration of the first and second light-emitting elements, which are connected to the light amount control unit shown in FIG. 10, on the first and second light source substrates, respectively.

FIG. 11 is a circuit diagram showing an arrangement configuration of the first and second light-emitting elements 212a(1) to 212a(16) and 212b(1) to 212b(12), which are connected to the light amount control unit 440 shown in FIG. 10, on the first and second light source substrates 213a and 213b, respectively.

As shown in FIG. 11, in the first light source group 220a, between the first light-emitting elements (for example, between 212a(1) and 212a(2), between 212a(2) and 212a(3) and between 212a(3) and 212a(4)) on one wire (for example, A1) among the four first wires A1, A2, A3 and A4, the first light-emitting elements (for example, [212a(5), 212a(9) and 212a(13)], [212a(6), 212a(10) and 212a(14)] and [212a(7), 212a(11) and 212a(15)]) on the other wires (A2 to A4, for example) are separately arranged in a row in the same arrangement order in the main scanning direction X. Meanwhile, in the second light source group 220b, between the second light-emitting elements (for example, between 212b(1) and 212b(2), between 212b(2) and 212b(3) and between 212b(3) and 212b(4)) on one wire (B1, for example) among the three second wires B1, B2 and B3, the second light-emitting elements (for example, [212b(5) and 212b(9)], [212b(6) and 212b(10)] and [212b(7) and 212a(11)]) on the other wires (for example, B2 and B3) are separately arranged in a row in the same arrangement order in the main scanning direction X. With this configuration, even if the light-emitting elements (for example, the first light-emitting elements 212a(1) to 212a(4) connected to the first wire A1) arranged in units of a plurality thereof (specifically, in units of four) in series become unlighted, since the light-emitting elements (for example, the first light-emitting elements 212a(1) to 212a(4)) interspersed in the main scanning direction X are unlighted, the unlighted light-emitting elements (for example, the first light-emitting elements 212a(1) to 212a(4)) can be dispersed in the main scanning direction X, and it is thus possible to disperse the width in the main scanning direction X of an area in which the illuminance declines on the irradiated face Gd of the original G, and make uneven illuminance less noticeable. Although the first wire A1 and the second wire B1 are taken as an example of one wire, the other first wires A2, A3 and A4 and second wires B2 and B3 can be explained similarly.

Specifically, in the first light source group 220a, the four first wires A1, A2, A3 and A4 except their light-emitting element mounting portions are arranged on the first light source substrate 213a along the main scanning direction X, while the light-emitting element mounting portions are alternately bent by 180° in the sub-scanning direction Y a plurality of times (here, four times) and successively arranged. The first light-emitting elements (specifically, [212a(1), 212a(2), 212a(3) and 212a(4)], . . . , [212a(13), 212a(14), 212a(15) and 212a(16)] are mounted on the respective light-emitting element mounting portions. In the second light source group 220b, the three second wires B1, B2 and B3 except light-emitting element mounting portions are arranged on the second light source substrate 213b along the main scanning direction X, while the light-emitting element mounting portions are alternately bent by 180° in the sub-scanning direction Y a plurality of times (here, four times) and successively arranged. The second light-emitting elements (specifically, [212b(1), 212b(2), 212b(3) and 212b(4)], . . . , [212b(9), 212b(10), 212b(11) and 212b(12)] are mounted on the respective light-emitting element mounting portions.

Incidentally, as shown in FIG. 7(c), the illumination distribution α3 is a distribution that repeats the same waveform in a cycle, which is a length (specifically, 72 mm) of a least common multiple of the lengths (specifically, 18 mm and 24 mm) of the pitches (specifically, P1 and P2) in the plurality of rows of light source groups (specifically, the first light source group 220a and the second light source group 220b).

From this viewpoint, in the present embodiment, each of the four first wires A1, A2, A3 and A4 in the first light source group 220a connects the first light-emitting elements 212a(1) to 212a(4), 212a(5) to 212a(8), 212a(9) to 212a(12) and 212a(13) to 212a(16) arranged in the main scanning direction X in the first light source group 220a in series in units of four, which is the number obtained by dividing the length of 72 mm of the least common multiple of the lengths 18 mm and 24 mm of the pitches P1 and P2 in the first light source group 220a and the second light source group 220b by the length of 18 mm of the pitch P1 between the first light-emitting elements 212a(1), . . . 212a(16) in the first light source group 220a. Meanwhile, each of the three second wires B1, B2 and B3 in the second light source group 220b connects the second light-emitting elements 212b(1) to 212b(4), 212b(5) to 212b(8) and 212b(9) to 212b(12) arranged in the main scanning direction X in the second light source group 220b in series in units of three, which is the number obtained by dividing the length of 72 mm of the least common multiple of the lengths 18 mm and 24 mm of the pitches P1 and P2 in the first light source group 220a and the second light source group 220b by the length of 24 mm of the pitch P2 between the second light-emitting elements 212b(1), . . . , 212b(12) in the second light source group 220b.

With this configuration, the amounts of light of the first and second light-emitting elements 212a(1), . . . 212a(16) and 212b(1), . . . 212b(12) in the first and second light source groups 220a and 220b set by the setting unit 442 can be set in accordance with the cycle of the illumination distribution α3 (see FIG. 7(c)), and it is thus possible to easily adjust the amounts of light with accuracy.

In FIG. 11, reference characters Ta1 to Ta16 represent positions (arrangement order) of the first light-emitting elements 212a(1), . . . 212a(16) arranged on the first light source substrate 213a, and reference characters Tb1 to Tb12 represent positions (arrangement order) of the second light-emitting elements 212b(1), . . . 212b(12) arranged on the second light source substrate 213b.

Figure 12:
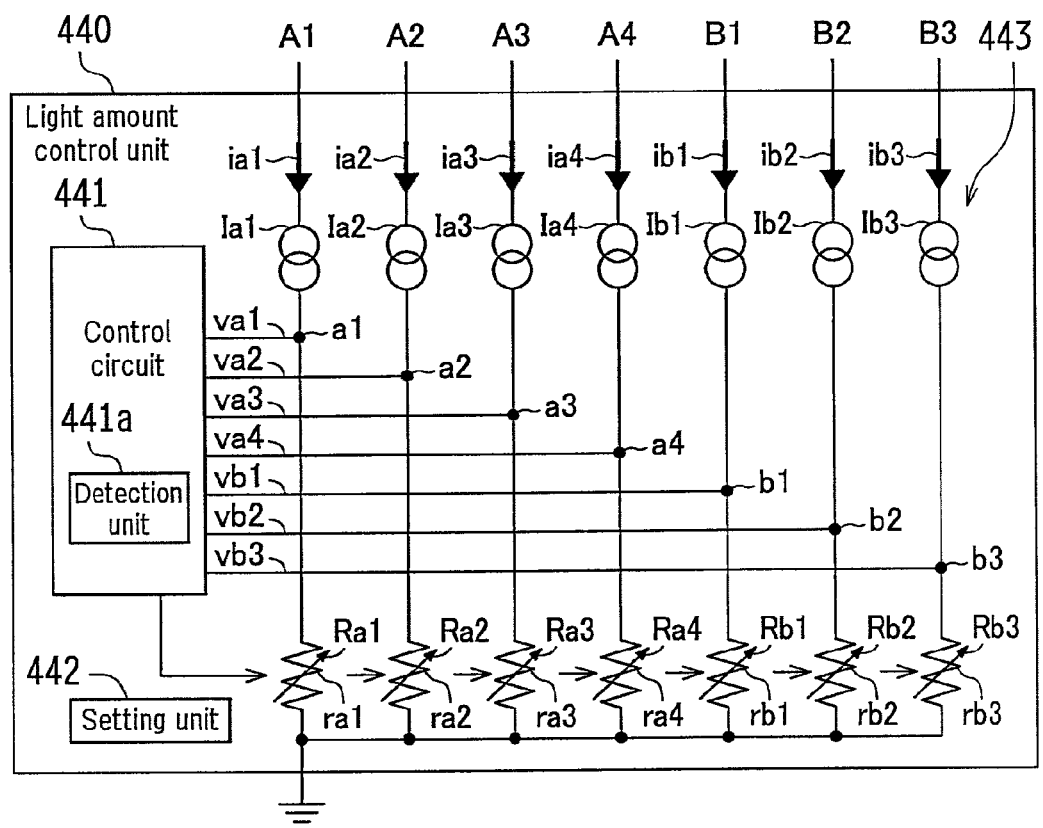
FIG. 12 is a circuit diagram showing an example of a detailed schematic configuration for the light amount control shown in FIG. 8.

FIG. 12 is a circuit diagram showing an example of a detailed schematic configuration of the light amount control unit 440 shown in FIG. 8.

As shown in FIG. 12, the adjustment unit 443 includes constant current means Ia1 to Ia4 and Ib1 to Ib3, and variable resistance means Ra1 to Ra4 and Rb1 to Rb3. One ends of the constant current means Ia1 to Ia4 are connected to the first wires A1 to A4, and the other ends are connected to the variable resistance means Ra1 to Ra4. One ends of the constant current means Ib1 to Ib3 are connected to the second wires B1 to B2, and the other ends are connected to the variable resistance means Rb1 to Rb3.

The control circuit 441 is connected to connecting portions a1 to a4 between the constant current means Ia1 to Ia4 and the variable resistance means Ra1 to Ra4, and is configured to constantly keep the terminal voltages Va1 to Va4 at the connecting portions a1 to a4 at the same voltage value at the time of light emission. The control circuit 441 is also connected to connecting portions b1 to b3 between the constant current means Ib1 to Ib3 and the variable resistance means Rb1 to Rb3, and is configured to constantly keep the terminal voltages Vb1 to Vb3 at the connecting portions b1 to b3 at the same voltage value at the time of light emission.

The constant current means Ia1 to Ia4 are configured to adjust the current that flows through the first wires A1, A2, A3 and A4 that connect the first light-emitting elements 212a(1) to 212a(4), 212a(5) to 212a(8), 212a(9) to 212a(12) and 212a(13) to 212a(16) respectively to a fixed current value. The constant current means Ib1 to Ib3 are similarly configured to adjust the current that flows through the second wires B1, B2 and B3 that connect the second light-emitting elements 212b(1) to 212b(4), 212b(5) to 212b(8) and 212b(9) to 212b(12) respectively to a fixed current value. The constant current means Ia1 to Ia4 and Ib1 to Ib3 may be conventionally known ones. Examples of the constant current means Ia1 to Ia4 and Ib1 to Ib3 may include constant current circuits including a transistor and a regulator, for example.

The variable resistance means Ra1 to Ra4 and Rb1 to Rb3 are configured to change their own resistance values upon being controlled to operate by the control circuit 441. The variable resistance means Ra1 to Ra4 and Rb1 to Rb3 may be conventionally known ones. Examples of the variable resistance means Ra1 to Ra4 and Rb1 to Rb3 may typically include, but not limited to a digital variable resistor using a semiconductor switch, which is controlled to operate by the control circuit 441, and may be one that controls operation of a semiconductor switch connected in parallel to each of a plurality of fixed resistors connected in series, thereby switching between those fixed resistors to which a current is applied, or one that controls operation of a semiconductor switch with one terminal connected to each connecting points of a plurality of fixed resistors connected in series, thereby switching between the fixed resistors to which a current is applied.

In the light amount control unit 440 having the above-described configuration, the respective terminal voltages va1 to va4 and vb1 to vb3 in the connecting portions a1 to a4 and b1 to b3 are constantly kept at the same voltage value by the control circuit 441. Therefore, as a result of changing resistance values ra1 to ra4 and rb1 to rb3 of the variable resistance means Ra1 to Ra4 and Rb1 to Rb3, according to formulas ia1=va1/ra1, ia2=va2/ra2, ia3=va3/ra3, ia4=va4/ra4, ib1=vb1/rb1, ib2=vb2/rb2 and ib3=vb3/rb3, the currents ia1 to ia4 that flow through the first wires A1 to A4 can be changed by the constant current means Ia1 to Ia4, and the currents ib1 to ib3 that flow through the second wires B1 to B3 can be changed by the constant current means Ib1 to Ib3.

Note that the light amount control unit 440 may also be configured to change the currents ia1 to ia4 that flow through the first wires A1 to A4 with the constant current means Ia1 to Ia4 and change the currents ib1 to ib3 that flow through the second wires B1 to B3 with the constant current means Ib1 to Ib3 by fixing the resistance values ra1 to rb4 and changing the terminal voltages va1 to va4 and vb1 to vb3 in the connecting portions a1 to a4 and b1 to b3 with the control circuit 441.

Further, the detection unit 441a is configured to detect whether or not the first light-emitting elements 212a(1) to 212a(4), 212a(5) to 212a(8), 212a(9) to 212a(12) and 212a(13) to 212a(16) and the second light-emitting elements 212b(1) to 212b(4), 212b(5) to 212b(8) and 212b(9) to 212b(12), which are connected in series in units of four, have become unlighted.

Specifically, the detection unit 441a detects whether or not the first light-emitting elements 212a(1) to 212a(4), 212a(5) to 212a(8), 212a(9) to 212a(12) and 212a(13) to 212a(16) and the second light-emitting elements 212b(1) to 212b(4), 212b(5) to 212b(8), and 212b(9) to 212b(12) have become unlighted based on whether or not the terminal voltages va1 to va4 and vb1 to vb3 at the connecting portions a1 to a4 and b1 to b3 become 0V. For example, if the terminal voltage va1 in the connecting portion a1 on the first wire A1 connected to the first light-emitting elements 212a(1) to 212a(4) becomes 0V due to disconnection of the first wire A1, or due to defect of the first light-emitting elements 212a(1) to 212a(4), the detection unit 441a can recognize that the first light-emitting elements 212a(1) to 212a(4) have become unlighted. Similarly, it can also recognize the first light-emitting elements 212a(5) to 212a(8), 212a(9) to 212a(12) and 212a(13) to 212a(16) connected to the other first wires A2 to A4, and the second light-emitting elements 212b(1) to 212b(4), 212b(5) to 212b(8) and 212b(9) to 212b(12) connected to the second wires B1 to B3.

If, as a result of the detection by the detection unit 441a, the first light-emitting elements 212a(1) to 212a(4), 212a(5) to 212a(8), 212a(9) to 212a(12) and 212a(13) to 212a(16) and the second light-emitting elements 212b(1) to 212b(4), 212b (5) to 212b(8) and 212b(9) to 212b(12) that are connected in series in units of a plurality of light-emitting elements (specifically, in units of four) become unlighted, the light amount control unit 440 performs control as below.

Specifically, it performs the first light amount control for increasing, to the amount of light with which the illumination distribution α3 shown in FIG. 3 falls within the uneven illuminance reference range, the amounts of light of the light-emitting elements (for example, [212a(5)], [212a(13) and 212a(6)], [212a(14) and 212a(7)] and [212a(15) and 212a(8)]) adjacent to (at least one of both adjoining light-emitting elements if each unlighted light-emitting element is located at a position other than both ends; and one adjoining light-emitting element if the unlighted light-emitting element is located at an end) the unlighted light-emitting elements (for example, 212a(1) to 212a(4)) in the light source group (for example, the first light source group 220a) of the unlighted light-emitting elements (for example, 212a(1) to 212a(4)). In the first light amount control here, the amounts of light of the light-emitting elements for which the amounts of light need to be controlled are increased by the first increased light amounts Na1 or Na2 or the second increased light amount Nb1 or Nb2 (see FIG. 8) stored in advance in the storage unit 520.

Here, the first increased light amount Na1 or the second increased light amount Nb1 stored in advance in the storage unit 520 is a value by which the amount of light of light-emitting element adjacent to the unlighted light-emitting elements (here, both adjoining light-emitting elements if each unlighted light-emitting element is located at a position other than both end; and one adjoining light-emitting element if the unlighted light-emitting element is located at an end) is changed to the amount of light with which the illumination distribution α3 falls within the uneven illuminance reference range. The first increased light amount Na2 or the second increased light amount Nb2 stored in advance in the storage unit 520 is a value by which the amount of light of the light-emitting element adjacent to an unlighted light-emitting element located at an end is changed to the amount of light with which the illumination distribution α3 falls within the uneven illuminance reference range. Those increased light amounts can be set in advance using design simulation for each light-emitting element and/or a single or a plurality of actual sample device(s).

As described above, decline in the illuminance of the unlighted light-emitting elements (for example, 212a(1) to 212a(4)) on the irradiated face Gd of the original G can be compensated by performing the first light amount control, and it is thus possible to maintain the light amount on the irradiated face Gd and, as shown in FIG. 9, keep the illumination distribution a4 within the uneven illuminance reference range.

The connection between the first light-emitting elements 212a(1) to 212a(16) and the first wires A1 to A4 in the first light source group 220a and the mutual positional relationship in the arrangement of the first light-emitting elements 212a(1) to 212a(16) on the first light source substrate 213a are stored in advance in the storage unit 520. The connection between the second light-emitting elements 212b(1) to 212b(12) in the second light source group 220b and the second wires B1 to B3 and the mutual positional relationship in the arrangement of the second light-emitting elements 212b(1) to 212b(12) on the second light source substrate 213b are also stored in advance in the storage unit 520.

Figure 13A:
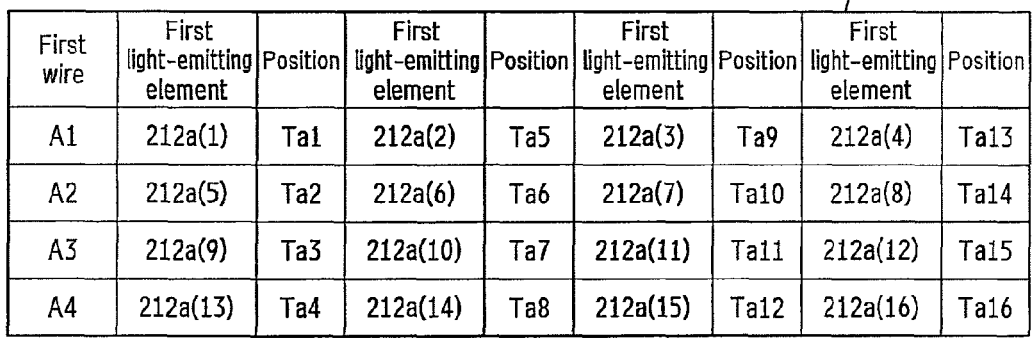
FIG. 13(a) is an example of the first position table storing a connection between the first light-emitting elements and first wires and a mutual positional relationship in the arrangement of the first light-emitting elements on the first light source substrate.
Figure 13B:
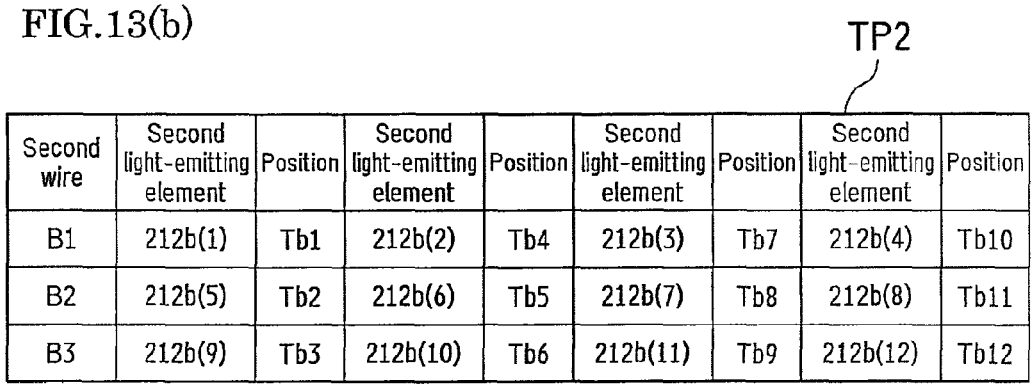
FIG. 13(b) is an example of the second position table storing a connection between the second light-emitting elements and second wires and a mutual positional relationship in the arrangement of the second light-emitting elements on the second light source substrate.

FIG. 13 are data structure diagrams of the first and second position tables TP1 and TP2. FIG. 13(a) shows an example of the first position table TP1 storing the connection between the first light-emitting elements 212a(1) to 212a(16) and the first wires A1 to A4 and the mutual positional relationship in the arrangement of the first light-emitting elements 212a(1) to 212a(16) on the first light source substrate 213a. FIG. 13(b) shows an example of the second position table TP2 storing the connection relationship between the second light-emitting elements 212b(1) to 212b(12) and the second wires B1 to B3 and the mutual positional relationship in the arrangement of the second light-emitting elements 212b(1) to 212b(12) on the second light source substrate 213b.

As shown in FIG. 13(a), the first position table TP1 stores that the first light-emitting elements connected to the first wire A1 are the first light-emitting elements 212a(1) to 212a(4), the first light-emitting elements connected to the first wire A2 are the first light-emitting elements 212a(5) to 212a(8), the first light-emitting elements connected to the first wire A3 are the first light-emitting elements 212a(9) to 212a(12), and the first light-emitting elements connected to the first wire A4 are the first light-emitting elements 212a(13) to 212a(16). The first position table TP1 also stores that the first light-emitting elements 212a(1), 212a(5), 212a(9), 212a(13), 212a(2), 212a(6), 212a(10), 212a(14), 212a(3), 212a(7), 212a(11), 212a(15), 212a(4), 212a(8), 212a(12) and 212a(16) are arranged in this order in association with the positions Ta1 to Ta16 (see FIG. 11) on the first light source substrate 213a. With this table, if, for example, the light-emitting elements on the first wire A1 become unlighted, the light amount control unit 440 can recognize the first light-emitting element 212a(5) adjacent to the first light-emitting element 212a(1) (one adjoining light-emitting element since the unlighted light-emitting element is located at an end), the first light-emitting elements 212a(13) and 212a(6) adjacent to the first light-emitting element 212a(2), the first light-emitting elements 212a(14) and 212a(7) adjacent to the first light-emitting element 212a(3), and the first light-emitting elements 212a(15) and 212a(8) adjacent to the first light-emitting element 212a(4), and increase the light amounts thereof. Also in the case where the light-emitting elements on the first wires A2 to A4 become unlighted, the light amount control unit 440 can recognize the light-emitting elements and increase the light amounts thereof.

Further, as shown in FIG. 13(b), the second position table TP2 stores that the second light-emitting elements connected to the second wire B1 are the second light-emitting elements 212b(1) to 212b(4), the second light-emitting elements connected to the second wire B2 are the second light-emitting elements 212b(5) to 212b(8), and the second light-emitting elements connected to the second wire B3 are the second light-emitting elements 212b(9) to 212b(12). The second position table TP2 also stores that the second light-emitting elements 212b(1) to 212b(12) are arranged in the order of 212b(1), 212b(5), 212b(9), 212b(2), 212b(6), 212b(10), 212b(3), 212b(7), 212b(11), 212b(4), 212b(8), and 212b(12) in association with the positions Tb1 to Tb12 (see FIG. 11) on the second light source substrate 213b. With this table, if, for example, the light-emitting elements on the second wire B1 become unlighted, the light amount control unit 440 can recognize the second light-emitting element 212b(5) adjacent to the second light-emitting element 212b(1) (one adjoining light-emitting element since the unlighted light-emitting element is located at an end), the second light-emitting elements 212b(9) and 212b(6) adjacent to the second light-emitting element 212b(2), the second light-emitting elements 212b(10) and 212b(7) adjacent to the second light-emitting element 212b(3), and the second light-emitting elements 212b(11) and 212b(8) adjacent to the second light-emitting element 212b(4), and increase the light amounts thereof. Also in the case where the light-emitting elements on the second wires B2 and B3 become unlighted, the light amount control unit 440 can recognize the light-emitting elements and increase the light amounts of thereof.

As described above, the first increased light amount Na1 by which two first light-emitting elements adjacent to the unlighted first light-emitting elements 212a(1), . . . 212a(16) that are not located at an end and the second increased light amount Nb1 by which two second light-emitting elements adjacent to the unlighted second light-emitting elements 212b(1), . . . 212b(12) that are not located at an end are stored in advance in the storage unit 520. Further, as described above, the first increased light amount Na2 by which one first light-emitting element adjacent to the unlighted first light-emitting elements 212a(1), . . . 212a(16) located at an end, and the second increased light amount Nb2 by which one second light-emitting element adjacent to the unlighted second light-emitting elements 212b(1), . . . , 212b(12) located at an end are stored in advance in the storage unit 520. Note that the first and second increased light amounts Na2 and Nb2 may be the light amount twice the first and second increased light amounts Na1 and Nb1, respectively.

Further, if, as a result of the detection by the detection unit 441a, the first light-emitting elements 212a(1) to 212a(4), 212a(5) to 212a(8), 212a(9) to 212a(12) and 212a(13) to 212a(16) and the second light-emitting elements 212b(1) to 212b(4), 212b(5) to 212b(8) and 212b(9) to 212b(12) that are connected in series in units of a plurality of light-emitting elements (specifically, in units of four) become unlighted, the light amount control unit 440 performs control as below.

In other words, it performs the second light amount control for increasing, to the amount of light with which the illumination distribution α3 shown in FIG. 7(c) falls within the uneven illuminance reference range, the light amounts of predetermined light-emitting elements (for example, [212b(1)], [212b(2)], [212b(3)] and [212b(4)]) in the other light source group (the second light source group 220b, for example) than the unlighted light-emitting elements (for example, 212a(1) to 212a(4)), the predetermined light-emitting elements involving the illumination distribution α3 of the unlighted light-emitting elements (for example, 212a(1) to 212a(4)) on the irradiated face Gd. In the second light amount control here, the amounts of light of the light-emitting elements for which the amounts of light need to be controlled are increased by the third increased light amount Nc(1) to Nc(20) in the first light amount table TL1 or the fourth increased light amounts Nd(1) to Nd(20) in the second light amount table TL2 (see FIG. 14 described later) stored in advance in the storage unit 520. Here, the third increased light amounts Nc(1) to Nc(20) in the first light amount table TL1 or the fourth increased light amounts Nd(1) to Nd(20) in the second light amount table TL2 stored in advance in the storage unit 520 are values by which the light amounts of the predetermined light-emitting elements that involve the illumination distribution α3 (contribute to the influence of the illuminance on the illumination distribution α3) of the unlighted light-emitting elements on the irradiated face Gd are changed to the amount of light with which the illumination distribution α3 falls within the uneven illuminance reference range. Those increased light amounts can be set in advance using design simulation for each light-emitting element and/or a single of a plurality of actual sample device(s).

As described above, the correspondence between the first light-emitting elements 212a(1) to 212a(16) in the first light source group 220a and the second light-emitting elements 212b(1) to 212b(12) that contribute to the influence of the illuminance on the illumination distribution a3 of the first light-emitting elements 212a(1) to 212a(16) (specifically, have close optical axis irradiation positions) are stored in advance in the storage unit 520. Further, as described above the correspondence between the second light-emitting elements 212b(1) to 212b(12) in the second light source group 220b and the first light-emitting elements 212a(1) to 212a(16) that contribute to the influence of the illuminance on the illumination distribution a3 of the second light-emitting elements 212b(1) to 212b(12) (specifically, have close optical axis irradiation positions) are stored in advance in the storage unit 520.

FIG. 14 are data structure diagrams of the first and second light amount tables TL1 and TL2. FIG. 14(a) shows an example of the first light amount table TL1 that stores the correspondence between the first light-emitting elements 212a(1) to 212a(16) and the second light-emitting elements 212b(1) to 212b(12) that contribute to the influence of the illuminance on the illumination distribution α3 of the first light-emitting elements 212a(1) to 212a(16), and the third increased light amounts Nc(1) to Nc(20) by which the amounts of light of the second light-emitting elements 212b(1) to 212b(12) are increased. FIG. 14(b) shows an example of the second light amount table TL2 that stores the correspondence between the second light-emitting elements 212b(1) to 212b(12) and the first light-emitting elements 212a(1) to 212a(16) that contribute to the influence of the illuminance on the illumination distribution α3 of the second light-emitting elements 212b(1) to 212b(12), and the fourth increased light amounts Nd(1) to Nd(20) by which the amounts of light of the first light-emitting elements 212a(1) to 212a(16) are increased.

As shown in FIG. 14(a), the first light amount table TL1 stores, in association with one another, the third increased light amount Nc(1) by which the amount of light of the second light-emitting element 212b(1) is increased with respect to the first light-emitting element 212a(1), the third increased light amount Nc(2) by which the amount of light of the second light-emitting element 212b(5) is increased with respect to the first light-emitting element 212a(5), the third increased light amounts Nc(3) and Nc(4) by which the amounts of light of the second light-emitting elements 212b(5) and 212b(9) are increased with respect to the first light-emitting element 212a(9), the third increased light amount Nc(5) by which the amount of light of the second light-emitting element 212b(9) is increased with respect to the first light-emitting element 212a(13), the third increased light amount Nc(6) by which the amount of light of the second light-emitting element 212b(2) is increased with respect to the first light-emitting element 212a(2), the third increased light amount Nc(7) by which the amount of light of the second light-emitting element 212b(6) is increased with respect to the first light-emitting element 212a(6), the third increased light amounts Nc(8) and Nc(9) by which the amounts of light of the second light-emitting elements 212b(6) and 212b(10) are increased with respect to the first light-emitting element 212a(10), the third increased light amount Nc(10) by which the amount of light of the second light-emitting element 212b(10) is increased with respect to the first light-emitting element 212a(14), the third increased light amount Nc(11) by which the amount of light of the second light-emitting element 212b(3) is increased with respect to the first light-emitting element 212a(3), the third increased light amount Nc(12) by which the amount of light of the second light-emitting element 212b(7) is increased with respect to the first light-emitting element 212a(7), the third increased light amounts Nc(13) and Nc(14) by which the amounts of light of the second light-emitting elements 212b(7) and 212b(11) are increased with respect to the first light-emitting element 212a(11), the third increased light amount Nc(15) by which the amount of light of the second light-emitting element 212b(11) is increased with respect to the first light-emitting element 212a(15), the third increased light amount Nc(16) by the light amount of which the second light-emitting element 212b(4) is increased with respect to the first light-emitting element 212a(4), the third increased light amount Nc(17) by which the amount of light of the second light-emitting element 212b(8) is increased with respect to the first light-emitting element 212a(8), the third increased light amounts Nc(18) and Nc(19) by which the amounts of light of the second light-emitting elements 212b(8) and 212b(12) are increased with respect to the first light-emitting element 212a(12), and the third increased light amount Nc(20) by which the amount of light of the second light-emitting element 212b(12) is increased with respect to the first light-emitting element 212a(16). With this table, if, for example, the light-emitting elements on the first wire A1 become unlighted, the light amount control unit 440 can recognize the second light-emitting element 212b(1) that contributes to the influence of the illuminance on the first light-emitting element 212a(1), the second light-emitting element 212b(2) that contributes to the influence of the illuminance on the first light-emitting element 212a(2), the second light-emitting element 212b(3) that contributes to the influence of the illuminance on the first light-emitting element 212a(3), and the second light-emitting element 212b(4) that contributes to the influence of the illuminance on the first light-emitting element 212a(4), and increase the light amounts thereof. Also in the case where the light-emitting elements on the first wires A2 to A4 become unlighted, the light amount control unit 440 can recognize the light-emitting elements and increase the light amounts thereof.

Further, as shown in FIG. 14(b), the second light amount table TL2 stores, in association with one another, the fourth increased light amount Nd(1) by which the amount of light of the first light-emitting element 212a(1) is increased with respect to the second light-emitting element 212b(1), the fourth increased light amounts Nd(2) and Nd(3) by which the amounts of light of the first light-emitting elements 212a(5) and 212a(9) are increased with respect to the second light-emitting element 212b(5), the fourth increased light amounts Nd(4) and Nd(5) by which the amounts of light of the first light-emitting element 212a(9) and 212a(13) are increased with respect to the second light-emitting element 212b(9), the fourth increased light amount Nd(6) by which the amount of light of the first light-emitting element 212a(2) is increased with respect to the second light-emitting element 212b(2), the fourth increased light amounts Nd(7) and Nd(8) by which the amounts of light of the first light-emitting elements 212a(6) and 212a(10) are with respect to the second light-emitting element 212b(6), the fourth increased light amounts Nd(9) and Nd(10) by which the amounts of light of the first light-emitting elements 212a(10) and 212a(14) are with respect to the second light-emitting element 212b(10), the fourth increased light amount Nd(11) by which the amount of light of the first light-emitting element 212a(3) is increased with respect to the second light-emitting element 212b(3), the fourth increased light amounts Nd(12) and Nd(13) by which the amounts of light of the first light-emitting element 212a(7) and 212a(11) are increased with respect to the second light-emitting element 212b(7), the fourth increased light amounts Nd(14) and Nd(15) by which the amounts of light of the first light-emitting element 212a(11) and 212a(15) are increased with respect to the second light-emitting element 212b(11), the fourth increased light amount Nd(16) by which the amount of light of the second light-emitting element 212b(4) is increased with respect to the second light-emitting element 212b(4), the fourth increased light amounts Nd(17) and Nd(18) by which the light amounts of the first light-emitting elements 212a(8) and 212a(12) are increased with respect to the second light-emitting element 212b(8), and the fourth increased light amounts Nd(19) and Nd(20) by which the amounts of light of the first light-emitting elements 212a(12) and 212a(16) are increased with respect to the second light-emitting element 212b(12). With this table, if, for example, the light-emitting elements on the second wire B1 become unlighted, the light amount control unit 440 can recognize the first light-emitting element 212a(1) that contributes to the influence on the illuminance of the second light-emitting element 212b(1), the first light-emitting element 212a(2) that contributes to the influence of the illuminance on the second light-emitting element 212b(2), the first light-emitting element 212a(3) that contributes to the influence of the illuminance on the second light-emitting element 212b(3), and the first light-emitting element 212a(4) that contributes to the influence of the illuminance on the second light-emitting element 212b(4), and increase the light amounts thereof. Also in the case where the light-emitting elements on the second wires B2 to B3 become unlighted, the light amount control unit 440 can recognize the light-emitting elements and increase the light amounts thereof.

As described above, decline in the illuminance of the unlighted light-emitting elements (for example, 212a(1) to 212b(4)) on the irradiated face Gd of the original G can be compensated by performing the second light amount control, and it is thus possible to maintain the light amount on the irradiated face Gd and, as shown in FIG. 9, keep the illumination distribution a4 within the uneven illuminance reference range.

Furthermore, in the case of increasing the light amounts of the predetermined light-emitting elements (for example, 212b(1) to 212b(4)) corresponding to the unlighted light-emitting elements (for example, 212a(1) to 212a(4)) in the other light source group (for example, the second light source group 220b) than that of the unlighted light-emitting elements (for example, 212a(1) to 212a(4)), the predetermined light-emitting elements (for example, 212b(1) to 212b(4)) are connected in series to a wire (for example, one second wire B1) (see FIG. 11), and accordingly, only the amounts of light of the light-emitting elements (for example, 212b(1) to 212b(4)) connected on this wire (for example, the single second wire B1) need to be adjusted.

In the present embodiment, if both the first light amount control and the second light amount control are performed, the fifth increased light amounts Ne1 and Ne2 (see FIG. 8), the sixth increased light amounts Nf1 and Nf2 (see FIG. 8), the seventh increased light amounts Ng(1) to Ng(20) (see FIG. 14(a)) and the eighth increased light amounts Nh(1) to Nh(20) (see FIG. 14(b)) may be stored in advance in the storage unit.

Specifically, if both the first light amount control and the second light amount control are performed, in the first light amount control, the fifth increased light amounts Ne1 and Ne2 and the sixth increased light amounts Nf1 and Nf2 may be used instead of the first increased light amounts Na1 and Na2 and the second increased light amounts Nb1 and Nb2, respectively, and in the second light amount control, the seventh increased light amounts Ng(1) to Ng(20) and the eighth increased light amounts Nh(1) to Nh(20) may be used instead of the third increased light amounts Nc(1) to Nc(20) and the fourth increased light amounts Nd(1) to Nd(20) shown in FIG. 14, respectively.

The fifth increased light amounts Ne1 and Ne2 and the sixth increased light amounts Nf1 and Nf2 shown in FIG. 8 and the seventh increased light amounts Ng(1) to Ng(20) and the eighth increased light amounts Nh(1) to Nh(20) shown in FIG. 14 are values with which the amounts of light of the light-emitting elements adjacent to an unlighted light-emitting elements (here, both light-emitting elements adjacent to the unlighted light-emitting elements if those unlighted light-emitting element are located at a position other than both ends; and one light-emitting element adjacent to the unlighted light-emitting elements if those unlighted light-emitting elements are located at an end) and the light amounts of the predetermined light-emitting elements that contribute to the influence of the illuminance on the illumination distribution $\alpha 3$ of the unlighted light-emitting elements on the irradiated face Gd are changed to the amount of light with which the illumination distribution $\alpha 3$ falls within the uneven illuminance reference range. Those increased light amounts can be set in advance using design simulation for each light-emitting element and/or a single of a plurality of actual sample device(s).

In the present embodiment, the numbers of the first wires A1 to A4 and the second wires B1 to B3 are four and three, respectively, and the number of the light-emitting elements connected to each wire is four. However, they are not limited thereto and may be appropriately set depending on the configuration of the light source 211, the light amount control unit 440, and the like. Further, a single light-emitting element may be connected to each wire, and the light amount control unit 440 may individually set and adjust the amounts of light of the light-emitting elements.

Further, the pitch P1 between the first light-emitting elements is 18 mm, and the pitch P2 between the second light-emitting elements is 24 mm. However, those pitches are not limited thereto and may be appropriately set depending the optical axis distance between the light-emitting elements and the light irradiation region Ld, the number of the arranged light-emitting elements, and the like.

Further, in the present embodiment, increments (relative values) of light amounts to original light amount values are stored as the increased light amounts in advance in the storage unit 520. However, absolute values obtained by adding the relative values to the original light amount values may alternatively be stored in the storage unit 520.

Other Embodiments

Figure 15:
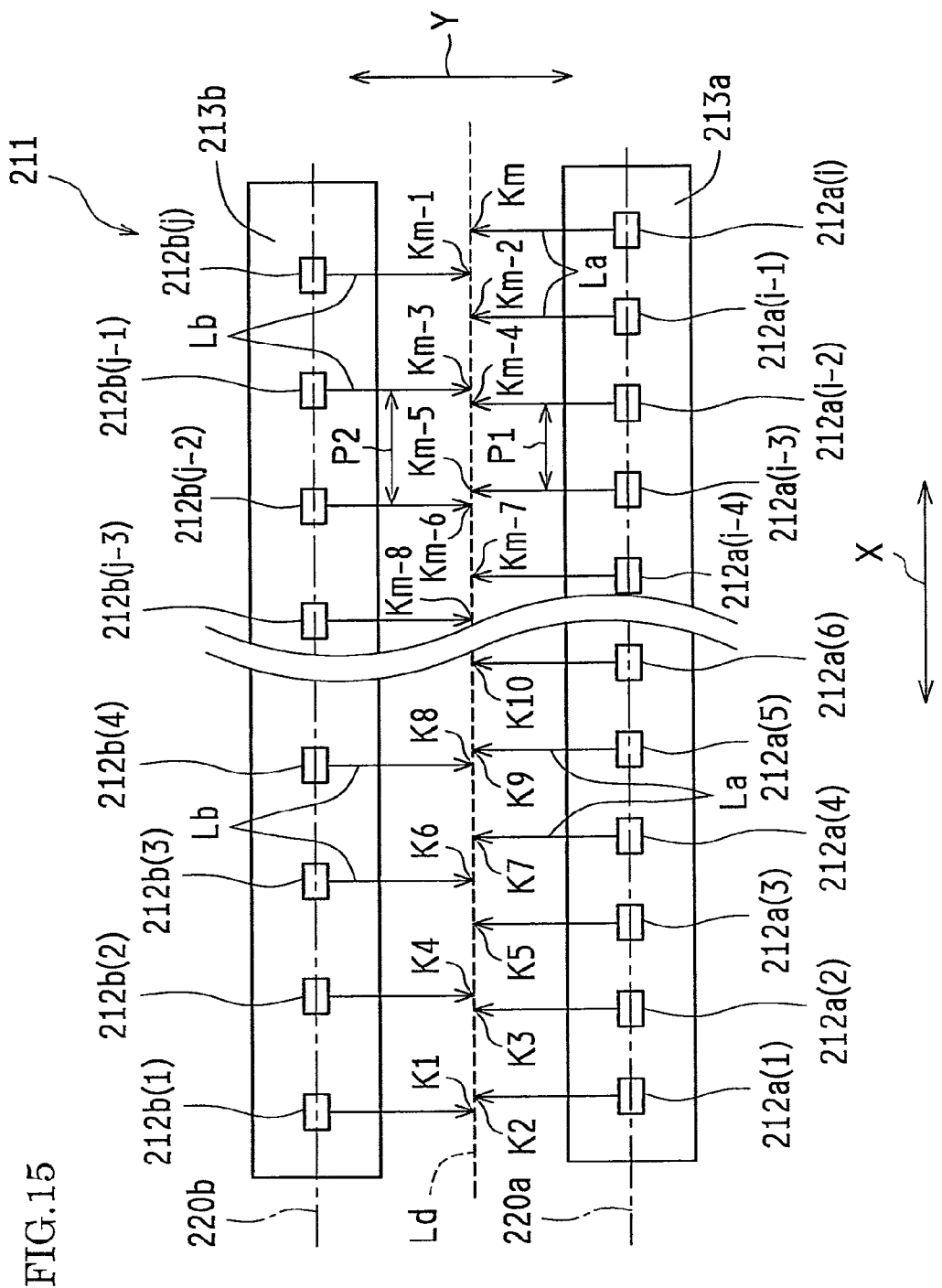
FIG. 15 is a schematic plan view showing another example of a state of arrangement of the first light source group and the second light source group mounted on the first light source substrate and the second light source substrate, respectively.

FIG. 15 is a schematic plan view showing another example of a state of arrangement of the first light source group 220a and the second light source group 220b mounted on the first light source substrate 213a and the second light source substrate 213b, respectively.

The first light source group 220a and the second light source group 220b shown in FIG. 15 have the same configuration as the first light source group 220a and the second light source group 220b shown in FIG. 6, except the first light source group 220a and the second light source group 220b on the first light source substrate 213a and the second light source substrate 213b are unchanged, while the first light source substrate 213a and the second light source substrate 213b are shifted in the main scanning direction X in the first light source group 220a and the second light source group 220b shown in FIG. 6. Note that at least one of the first light source group 220a and the second light source group 220b may be moved in the main scanning direction X on the first light source substrate 213a and the second light source substrate 213b.

In this configuration, none of the optical axis irradiation positions K1, . . . Km-1 and Km (see FIG. 15 described later) of the plurality of light-emitting elements (specifically, the first light-emitting elements 212a(1), . . . 212a(16) and the second light-emitting elements 212b(1), . . . 212b(12)) shown in FIG. 15 is a point in common for the plurality of rows of light source groups (specifically, the first light source group 220a and the second light source group 220b). Note that m is an integer of 4 or larger. In the present embodiment, m is 28. In the following description, it is assumed that m is 28.

In other words, the optical axis irradiation positions K2, K3, . . . K28 of the first light-emitting elements 212a(1), . . . 212a(16) in the first light source group 220a are different from the optical axis irradiation positions K1, K4, . . . K27 of the second light-emitting elements 212b(1), . . . 212b(12) in the second light source group 220b.

In the configuration shown in FIG. 15, none of the optical axis irradiation positions K1, . . . , K27, and K 28, which are the irradiation positions on the optical axes La, . . . , Lb, . . . on the irradiated face Gd in the main scanning direction X, is a point in common for the first light source group 220a and the second light source group 220b.

With this configuration, the number of the optical axis irradiation positions K1, . . . K27 and K28 can be as many as the total number (the maximum number) of the first light-emitting elements 212a(1), . . . 212a(16) and the second light-emitting elements 212b(1), . . . 212b(12) in the first light source group 220a and the second light source group 220b, and it is possible to make the uneven illuminance less noticeable as much.

Figure 16:
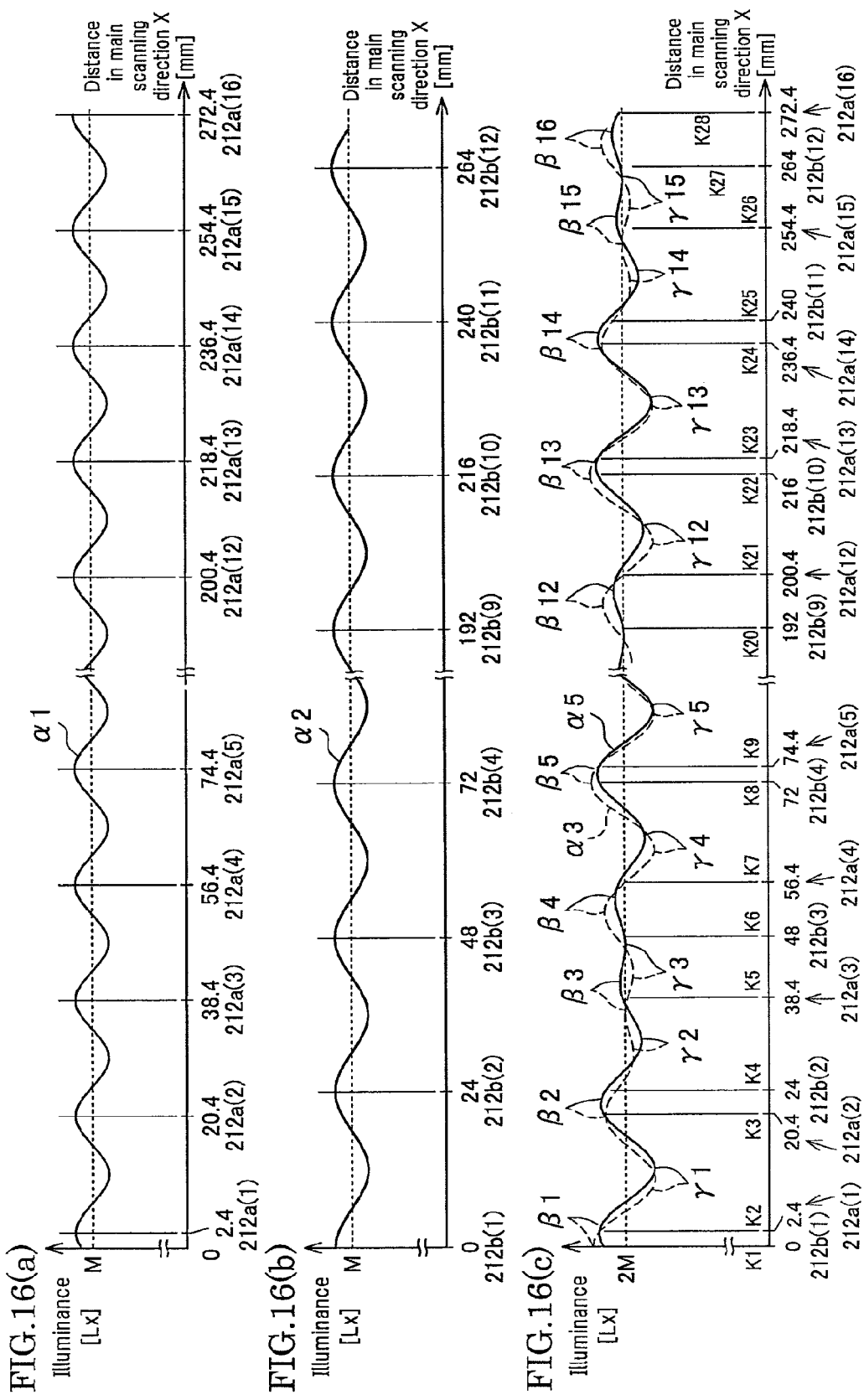
FIG. 16 are graphs showing an example of an illumination distribution when all light-emitting elements have the same amount of light and there is no common optical axis irradiation position, where

FIG. 16 are graphs showing an example of illumination distributions $\alpha 1$, $\alpha 2$ and $\alpha 5$ in the case where all light-emitting elements have the same amount of light and none of the optical axis irradiation positions K1, . . . , K27, and K28 is a point in common. FIG. 16(a) shows the illumination distribution $\alpha 1$ in the case where only the optical axes La, . . . of the first light-emitting elements 212a(1), . . . 212a(16) in the first light source group 220a are irradiated to the light irradiation region Ld. FIG. 16(b) shows the illumination distribution $\alpha 2$ in the case where only the optical axes Lb, . . . of the second light-emitting elements 212b(1), . . . 212b(12) in the second light source group 220b are irradiated to the light irradiation region Ld. FIG. 16(c) shows the illumination distribution $\alpha 5$ in the case where the optical axes La, . . . and Lb, . . . of the first and second light-emitting elements 212a(1), . . . 212a(16) and 212b(1), . . . 212b(12) in the first and second light source groups 220a and 220b are irradiated to the light irradiation region Ld. In FIG. 16(c), the broken line indicates the illumination distribution $\alpha 3$ shown in FIG. 7(c).

As shown in FIG. 16(c), with the illumination distribution $\alpha 5$ in the case where none of the optical axis irradiation positions K1, . . . , K27, and K28 is a point in common, the illuminance in the light irradiation region Ld can be dispersed in the main scanning direction X compared with the illumination distribution $\alpha 3$ (see the broken line in FIG. 16(c)) in the case where at least one, or K1, K7, . . . , K19, of the optical axis irradiation positions K1, . . . , K23 and K24 is the point in common.

Figure 17:
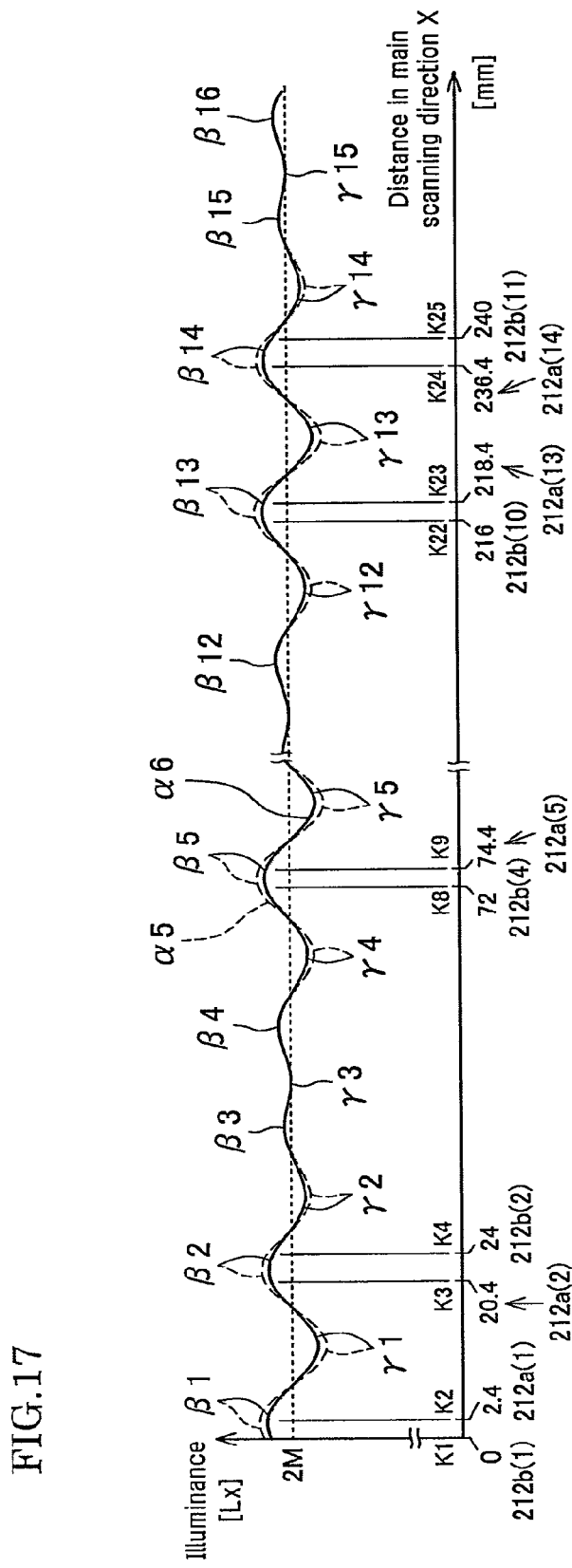
FIG. 17 is a graph showing an illumination distribution in the case where amounts of light of the first and second light-emitting elements are set to the amount of light with which the illumination distribution shown in FIG. 16(c) falls within an uneven illuminance reference range.

FIG. 17 is a graph showing an illumination distribution $\alpha 6$ in the case where the amounts of light of the first light-emitting elements 212a(1), . . . 212a(16) and the second light-emitting elements 212b(1), . . . 212b(12) are set to the amount of light with which the illumination distribution $\alpha 5$ shown in FIG. 16(c) falls within the uneven illuminance reference range. Note that in FIG. 17, the illumination distribution $\alpha 5$ shown in FIG. 16(c) is shown by a broken line.

In the example shown in FIG. 17, the amounts of light of the light-emitting elements that have close optical axis irradiation positions to each other in the first light source group 220a and the second light source group 220b are reduced. Specifically, the amounts of light of the first light-emitting elements 212a(1), 212a(2), 212a(5), 212a(6), 212a(9), 212a(10), 212a(13) and 212a(14) and/or the second light-emitting elements 212b(1), 212b(2), 212b(4), 212b(5), 212b(7), 212a(8), 212b(10) and 212b(11) that respectively have close optical axis irradiation positions to each other are lowered.

Figure 18:
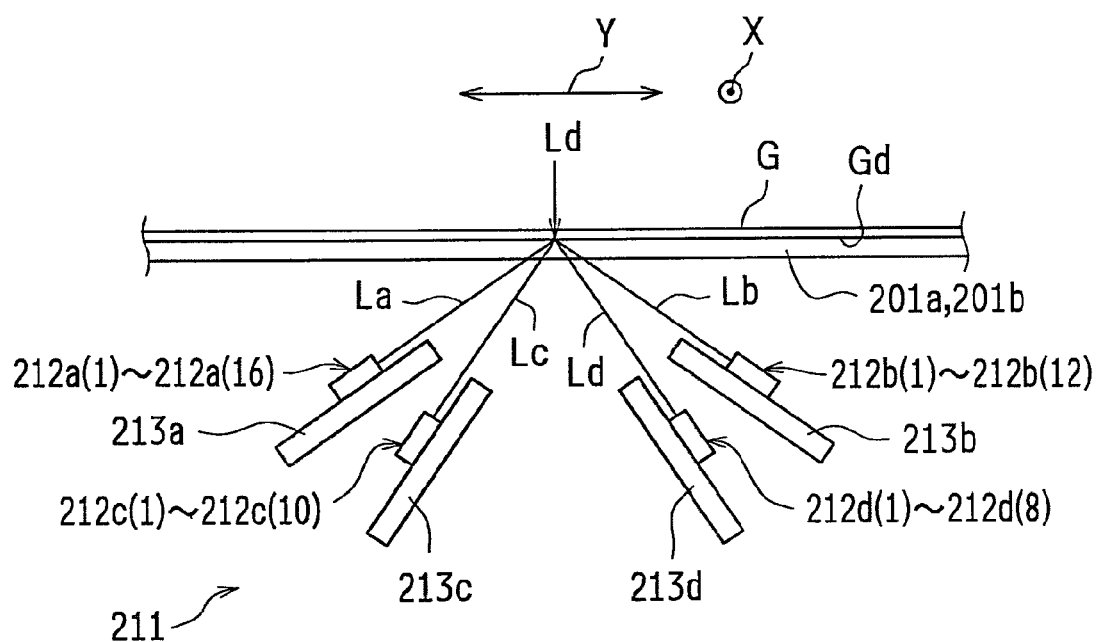
FIG. 18 is a schematic side view showing an example of a light source including four rows of the first to fourth light source groups.

In the present embodiment, the plurality of rows of light source groups are two rows of the first and second light source groups 220a and 220b, but may also be three or more rows of light source groups. FIG. 18 is a schematic side view showing an example of the light source 211 including four rows of the first to fourth light source groups 220a, 220b, 220c and 220d.

The light source 211 shown in FIG. 18 has the same configuration as the light source 211 shown in FIG. 4(b), except that the third light source group 210c and the fourth light source group 220d are added to the light source 211 shown in FIG. 4(b). Accordingly, in FIG. 18, the same members as those of the light source 211 shown in FIG. 4(b) are assigned the same reference numerals, and the description thereof is omitted.

Figure 19:
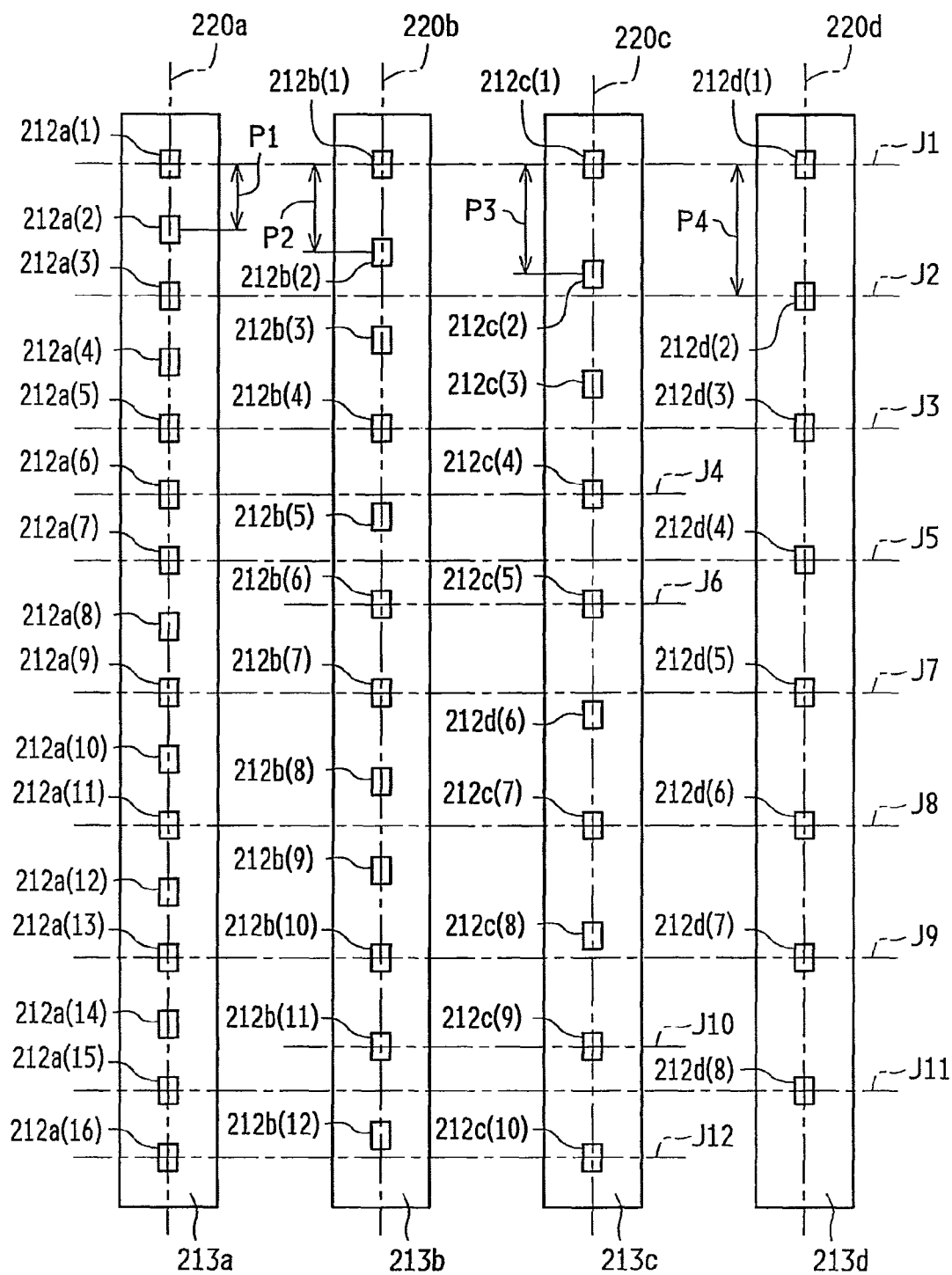
FIG. 19 is a plan view in which the first to fourth light source groups are extracted from the light source shown in FIG. 18 and arranged.

Further, FIG. 19 is a plan view in which the first to fourth light source groups 220a, 220b, 220c and 220d are extracted from the light source 211 shown in FIG. 18 and arranged.

The third light source group 210c and the fourth light source group 220d include the third light-emitting elements 212c(1), ... 212c(10) and the fourth light-emitting elements 212d(1), ... 212d(8), respectively. The third light-emitting elements 212c(1), ... 212c(10) and the fourth light-emitting elements 212d(1), ... 212d(8) are mounted on the third light source substrate 213c and the fourth light source substrate 213d, respectively.

All of the third light-emitting elements 212c(1), ... 212c(10) and the fourth light-emitting elements 212d(1), ... 212d(8) are light-emitting diode (LED) elements. The third and fourth light-emitting elements 212c(1), 212c(10) and 212d(1), ... 212d(8) have strong directional characteristics in a predetermined direction. The directions of the light irradiated from the third and fourth light-emitting elements 212c(1), ... 212c(10) and 212d(1), ... 212d(8) with the strongest luminous flux are the optical axes Lc, ..., Ld, .... Note that the third and fourth light-emitting elements 212c(1), ... 212c(10) and 212d(1), ... 212d(8) are of the same type (model) as the first and second light-emitting elements 212a(1), ... 212a(16) and 212b(1), ... 212b(12).

The third light-emitting elements 212c(1), ... 212c(10) and the fourth light-emitting elements 212d(1), ... 212d(8) irradiate light to the side of the fixed light irradiation region Ld that extends in the main scanning direction X in the original G. Note that all third optical axis distances, which are the distances of the optical axes La from the respective third light-emitting elements 212c(1), ... 212c(10) to the light irradiation region Ld, are the same distance. All fourth optical axis distances, which are the distances of the optical axes Lb from the respective fourth light-emitting elements 212d(1), ... 212d(8) to the light irradiation region Ld, are also the same distance. Here, the first to fourth optical axis distances are the same distance.

The third light-emitting elements 212c(1), ... 212c(10) in the third light source group 220c are arranged at a constant pitch (specifically, P3) in the same light source group (specifically, 220c), and the fourth light-emitting elements 212d(1), ... 212d(8) in the fourth light source group 220b are arranged at a constant pitch (specifically, P4) in the same light source group (specifically, 220d). Further, the first light-emitting elements 212a(1), ... 212a(16), the second light-emitting elements 212b(1), ... 212b(12), the third light-emitting elements 212c(1), ... 212c(10) and the fourth light-emitting elements 212d(1), ... 212d(8) have different pitches (P1<P2<P3<P4) among the first light source group 220a, the second light source group 220b, the third light source group 220c and the fourth light source group 220d. Specifically, the pitch P3 is 30 mm, and the pitch P4 is 36 mm. Note that the pitch P3 is a distance between the centers (light irradiating portion) of the third light-emitting elements in the main scanning direction X, and the pitch P4 is a distance between the centers (light irradiating portion) of the fourth light-emitting elements in the main scanning direction X. The wire arrangement and the light amount control for the light-emitting elements performed with respect to the third light source group 220c and the fourth light source group 220d may be configured similarly to the first light source group 220a and the second light source group 220b.

In the first to fourth light source groups 220a to 220d, the optical axis positions of the first light-emitting element 212a(1), the second light-emitting element 212b(1), the third light-emitting element 212c(1) and the fourth light-emitting element 212d(1) are located on the same assumed line J1. The optical axis irradiation positions of the first light-emitting elements 212a(3) and the fourth light-emitting element 212d(2) are located on the same assumed line J2. The optical axis irradiation positions of the first light-emitting element 212a(5), the second light-emitting element 212b(4) and the fourth light-emitting element 212d(3) are located on the same assumed line J3. The optical axis irradiation positions of the first light-emitting elements 212a(6) and the third light-emitting element 212c(4) are located on the same assumed line J4. The optical axis irradiation positions of the first light-emitting elements 212a(7) and the fourth light-emitting element 212d(4) are located on the same assumed line J5. The optical axis irradiation positions of the second light-emitting elements 212b(6) and the third light-emitting element 212c(5) are located on the same assumed line J6. The optical axis irradiation positions of the first light-emitting element 212a(9), the second light-emitting element 212b(7) and the fourth light-emitting element 212d(5) are located on the same assumed line J7. The optical axis irradiation positions of the first light-emitting element 212a(11), the third light-emitting element 212c(7) and the fourth light-emitting element 212d(6) are located on the same assumed line J8. The optical axis irradiation positions of the first light-emitting element 212a(13), the second light-emitting element 212b(10) and the fourth light-emitting element 212d(7) are located on the same assumed line J9. The optical axis irradiation positions of the second light-emitting elements 212b(11) and the third light-emitting element 212c(9) are located on the same assumed line J10. The optical axis irradiation positions of the first light-emitting elements 212a(15) and the fourth light-emitting element 212d(8) are located on the same assumed line J11. The optical axis irradiation positions of the first light-emitting elements 212a(16) and the third light-emitting element 212c(10) are located on the same assumed line J12. Note that a configuration where none of the optical axis irradiation positions of the light-emitting elements in the first to fourth light source groups 220a to 220d is a point in common may alternatively be adopted.

Figure 20:
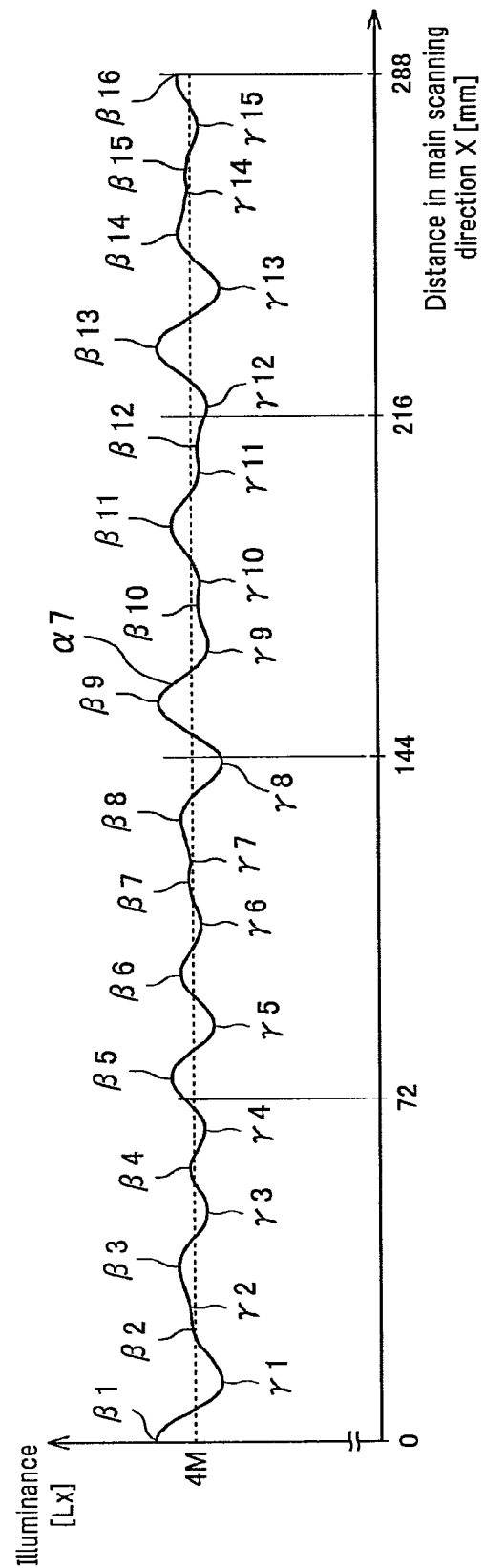
FIG. 20 is a graph showing an illumination distribution in the case where optical axes of the first to fourth light-emitting elements in the first to fourth light source groups are irradiated to the light irradiation region.

FIG. 20 is a graph showing the illumination distribution α7 in the case where the optical axes La, ..., Lb, ..., Lc, ... and Ld, ... of the first to fourth light-emitting elements 212a(1), ... 212a(16), 212b(1), ... 212b(12), 212c(1), ... 212c(10)

and 212*d*(1), . . . 212*d*(8) in the first to fourth light source groups 220*a*, 220*b*, 220*c* and 220*d* are irradiated to the light irradiation region Ld.

As shown in FIG. 20, in many parts of the illumination distribution α7, the degree of illuminance difference between peaks β1 to β15 in bright areas and troughs γ1 to γ15 in dark areas is small compared with the illumination distribution α3 shown in FIG. 7(*c*), and it is thus possible to suppress uneven illuminance and further make the uneven illuminance less noticeable.

Note that the above-described image reading apparatus 100 is of a reduction optical system type, but may alternatively be an image reading apparatus of a same-size optical system.

Example

Next, Example 1 where a ripple ratio was calculated under the conditions that the number of the first light-emitting elements 212*a* is 29, the number of the second light-emitting elements 212*b* is 19, the pitch P1 between the first light-emitting elements 212*a* is 10 mm and the pitch P2 between the second light-emitting elements 212*b* is 15 mm in the light source 211 shown in FIG. 14 was compared with Example 2 where a ripple ratio was calculated under the conditions that, in the configuration of Example 1, the light amounts of light-emitting elements corresponding to parts with large light amounts in a light amount distribution were reduced. This comparison is described below.

FIG. 21 show light amount distributions in Example 1 in the case where all of the first light-emitting elements 212*a*(1), . . . 212*a*(29) in the first light source group 220*a* have the same amount of light and all of the second light-emitting elements 212*b*(1), . . . 212*b*(19) in the second light source group 220*b* also have the same amount of light that is different from the amount of light of the first light-emitting elements 212*a*(1), . . . 212*a*(29). FIG. 22 show light amount distributions in Example 2 in the case where, in the configuration of Example 1, the amounts of light of the light-emitting elements having the optical axis irradiation positions at the points in common for the first light source group 220*a* and the second light source group 220*b* are reduced. FIG. 21(*a*) and FIG. 22(*a*) show light amount distributions solely of the first light source group 220*a*, FIG. 21(*b*) and FIG. 22(*b*) show light amount distributions solely of the second light source group 220*b*, and FIG. 21(*c*) and FIG. 22(*c*) show light amount distributions obtained by combining the light amount distributions of the first and second light source groups 220*a* and 220*b*. In FIGS. 21 and 22, the vertical axis indicates light amounts, and the unit thereof is a ratio relative to the light amount of an optical axis (center) of a single light-emitting element.

In Example 1 and Example 2, the ripple ratios were calculated under the conditions that LEDs having a half-value angle of light distribution (directional) characteristics of approximately 45° are used as light-emitting elements, both the first and second optical axis distances Ha and Hb (see FIG. 4(*b*)) are 10 mm, and in Example 2, the light amounts of at least one (here, the first light-emitting elements 212*a*(1), 212*a*(4), . . . 212*a*(28)) of the first light-emitting elements 212*a*(1), 212*a*(4), . . . 212*a*(28) and the second light-emitting elements 212*b*(1), 212*b*(3), . . . 212*b*(19) respectively having the common optical axis irradiation positions K1, K5, K9, . . . K37 are reduced by 11.5%. Here, a ripple ratio is a value obtained by dividing a value obtained by subtracting the lowest light amount in each dark area from the highest light amount in each brightest area by an average value of the light amounts at the peak in each bright area and at the trough in each dark area. Note that since the light amount lowers at both ends in the main scanning direction X, the ripple ratios were calculated within a distance between 50 mm and 250 mm in the main scanning direction X.

As a result, the ripple ratio of the light amount distribution in Example 1 shown in FIG. 21(*c*) was 3.9%, while that of the light amount distribution in Example 2 shown in FIG. 22(*c*) was 3.4%, which was lower by 0.5%. From this result, it is understood that the uneven illuminance in the light irradiation region Ld in Example 2 was lessened compared with the uneven illuminance in the light irradiation region Ld in Example 1.

The present invention may be implemented in various other forms without departing from its gist or essential characteristics. Therefore, the above-described embodiments are only examples and should not be interpreted as being limiting. The scope of the present invention is indicated in the claims and not at all restricted by the specification itself. Furthermore, all variations or modifications that come within the range of equivalency of the claims are intended to be embraced therein.

What is claimed is:

1. An image reading apparatus provided with an illuminating apparatus including a plurality of rows of light source groups each having a plurality of light-emitting elements for irradiating light to an original that are arranged in a main scanning direction, and an original reading portion that reads light reflected from the original illuminated by the illuminating apparatus, the image reading apparatus comprising:
a setting portion configured to set a light amount of each light-emitting element in the plurality of rows of light source groups,
wherein at least one light source group among the plurality of rows of light source groups includes a plurality of wires each connecting the plurality of light-emitting elements in series in units of a plurality of light-emitting elements and between the plurality of light-emitting elements on a single wire among the plurality of wires, the plurality of light-emitting elements on another wire are separately arranged in a row in the same arrangement order in the main scanning direction, each of the plurality of wires in the at least one light source group connects in series the light-emitting elements arranged in the main scanning direction in the at least one light source group in units of the number of light-emitting elements obtained by dividing a length of a least common multiple of the pitches in the plurality of rows of light source groups by a length of the pitch between the light-emitting elements in the at least one light source group,
wherein the light-emitting elements in the plurality of rows of light source groups illuminate an irradiated face of the original at a constant pitch within the same light source group and at different pitches from each other among the plurality of rows of light source groups, and
if an illumination distribution that indicates uneven illuminance due to repeated areas of brightness and darkness on the irradiated face of the original in the main scanning direction falls out of a predetermined reference range of uneven illuminance, the light-emitting elements in the plurality of rows of light source groups are set by the setting portion to have a light amount with which the illumination distribution falls within the reference range.

2. The image reading apparatus according claim 1,
wherein at least one of optical axis irradiation positions, each of which is an irradiation position on an optical axis to the irradiated face in the main scanning direction, of the plurality of light-emitting elements in at least two light source groups among the plurality of rows of light source groups is a point in common for the at least two light source groups.

3. The image reading apparatus according claim 1,
wherein each of the plurality of light-emitting elements in the plurality of rows of light source groups has an optical axis irradiation position that is an irradiation position of an optical axis to the irradiated face in the main scanning direction and all the optical axis irradiation positions are different.

4. The image reading apparatus according to claim 1,
wherein if the plurality of light-emitting elements connected in series in units of a plurality of light-emitting elements become unlighted, a first light amount control for increasing, to a light amount with which the illumination distribution falls within the reference range, a light amount of a light-emitting element located adjacent to an unlighted light-emitting element in the light source group of the unlighted light-emitting elements is performed.

5. The image reading apparatus according to claim 1,
wherein if the plurality of light-emitting elements connected in series in units of a plurality of light-emitting elements become unlighted, a second light among control for increasing, to a light amount with which the illumination distribution falls within the reference range, a light amount of a predetermined light-emitting element in the light source group other than the light source group of the unlighted light-emitting elements that involves the illumination distribution of the unlighted light-emitting elements on the irradiated face is performed.

6. The image reading apparatus according to claim 4,
wherein if the plurality of light-emitting elements connected in series in units of a plurality of light-emitting elements become unlighted, a second light among control for increasing, to a light amount with which the illumination distribution falls within the reference range, a light amount of a predetermined light-emitting element in the light source group other than the light source group of the unlighted light-emitting elements that involves the illumination distribution of the unlighted light-emitting elements on the irradiated face is performed.

7. An image forming apparatus comprising: the image reading apparatus according to claim 1; and an image forming portion configured to form an image of the original read by the image reading apparatus on a recording sheet.

8. The image reading apparatus according to claim 2,
wherein at least one light source group among the plurality of rows of light source groups includes a plurality of wires each connecting the plurality of light-emitting elements in series in units of a plurality of light-emitting elements.

9. The image reading apparatus according to claim 3,
wherein at least one light source group among the plurality of rows of light source groups includes a plurality of wires each connecting the plurality of light-emitting elements in series in units of a plurality of light-emitting elements.

10. An image forming apparatus comprising: the image reading apparatus according to claim 2; and an image forming portion configured to form an image of the original read by the image reading apparatus on a recording sheet.

11. An image forming apparatus comprising: the image reading apparatus according to claim 3; and an image forming portion configured to form an image of the original read by the image reading apparatus on a recording sheet.

* * * * *